(12) United States Patent
Ishikawa et al.

(10) Patent No.: US 7,660,688 B2
(45) Date of Patent: Feb. 9, 2010

(54) SURFACE-PROFILE MEASURING INSTRUMENT

(75) Inventors: Nobuhiro Ishikawa, Tsukuba (JP); Shingo Kiyotani, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 249 days.

(21) Appl. No.: 11/896,903

(22) Filed: Sep. 6, 2007

(65) Prior Publication Data
US 2008/0065341 A1    Mar. 13, 2008

(30) Foreign Application Priority Data
Sep. 7, 2006   (JP) ............................. 2006-243376
Aug. 22, 2007  (JP) ............................. 2007-216380

(51) Int. Cl.
G01C 17/38   (2006.01)
G01B 5/004   (2006.01)
G01N 19/02   (2006.01)
(52) U.S. Cl. .............................. 702/95; 33/503; 73/104
(58) Field of Classification Search ............. 702/33–36, 702/41–44, 56, 66–67, 70–72, 75–76, 81, 702/84–85, 90–91, 94–95, 97, 104–106, 702/127, 141–142, 147, 150–153, 155–158, 702/166–168, 170, 182–185, 145; 700/108–110, 700/275, 279, 302–304; 703/2, 7; 33/503–504, 33/549, 551, 553–556, 558, 558.01, 559, 33/561; 73/104, 105
See application file for complete search history.

(56) References Cited

U.S. PATENT DOCUMENTS

| 5,832,416 | A  | * | 11/1998 | Anderson ................... 702/95 |
| 5,895,442 | A  | * | 4/1999  | Arndt ......................... 702/95 |
| 5,966,681 | A  | * | 10/1999 | Bernhardt et al. ........... 702/152 |
| 6,044,569 | A  | * | 4/2000  | Ogihara et al. ................ 33/503 |
| 6,307,084 | B1 | * | 10/2001 | Matsuki et al. ............... 558/58 |
| 6,453,730 | B2 | * | 9/2002  | Takemura .................... 73/105 |
| 6,895,359 | B2 | * | 5/2005  | Sakurada et al. ............ 702/167 |
| 7,100,429 | B2 | * | 9/2006  | Matsuki et al. ............... 73/105 |
| 7,392,692 | B2 | * | 7/2008  | Noda .......................... 73/105 |

(Continued)

FOREIGN PATENT DOCUMENTS

JP    A 05-256640    10/1993

(Continued)

*Primary Examiner*—Michael P. Nghiem
*Assistant Examiner*—Toan M Le
(74) *Attorney, Agent, or Firm*—Oliff & Berridge, PLC

(57) ABSTRACT

A surface-profile measuring instrument includes a movement-estimating unit that estimates a movement state of a drive mechanism in accordance with a scanning vector command issued by a scanning vector commanding unit to calculate an estimated movement state quantity, and a correction calculating unit that corrects a detection value of a drive sensor in accordance with the estimated movement state quantity calculated by the movement-estimating unit. The movement-estimating unit has a nominal model setting unit in which a nominal model from the scanning vector commanding unit to the probe is set. The correction calculating unit includes a correction-amount calculating unit that calculates a correction amount for correcting a measurement error generated by a deformation of the drive mechanism in accordance with the movement thereof and a measurement data synthesizing unit that synthesizes the detection value of the drive sensor and the displacement sensor and the calculated correction-amount calculated by the correction-amount calculating unit.

4 Claims, 22 Drawing Sheets

U.S. PATENT DOCUMENTS

| | | | | |
|---|---|---|---|---|
| 2001/0008994 | A1* | 7/2001 | Omori et al. | 702/95 |
| 2005/0076522 | A1* | 4/2005 | Matsuki et al. | 33/554 |
| 2005/0111725 | A1* | 5/2005 | Noda et al. | 382/141 |
| 2007/0056176 | A1* | 3/2007 | Matsumiya et al. | 33/551 |
| 2009/0037128 | A1* | 2/2009 | Kiyotani | 702/95 |

FOREIGN PATENT DOCUMENTS

| | | |
|---|---|---|
| JP | A 07-324928 | 12/1995 |
| JP | A 2005-078571 | 3/2005 |
| JP | A 2005-181293 | 7/2005 |

* cited by examiner

FIG.6
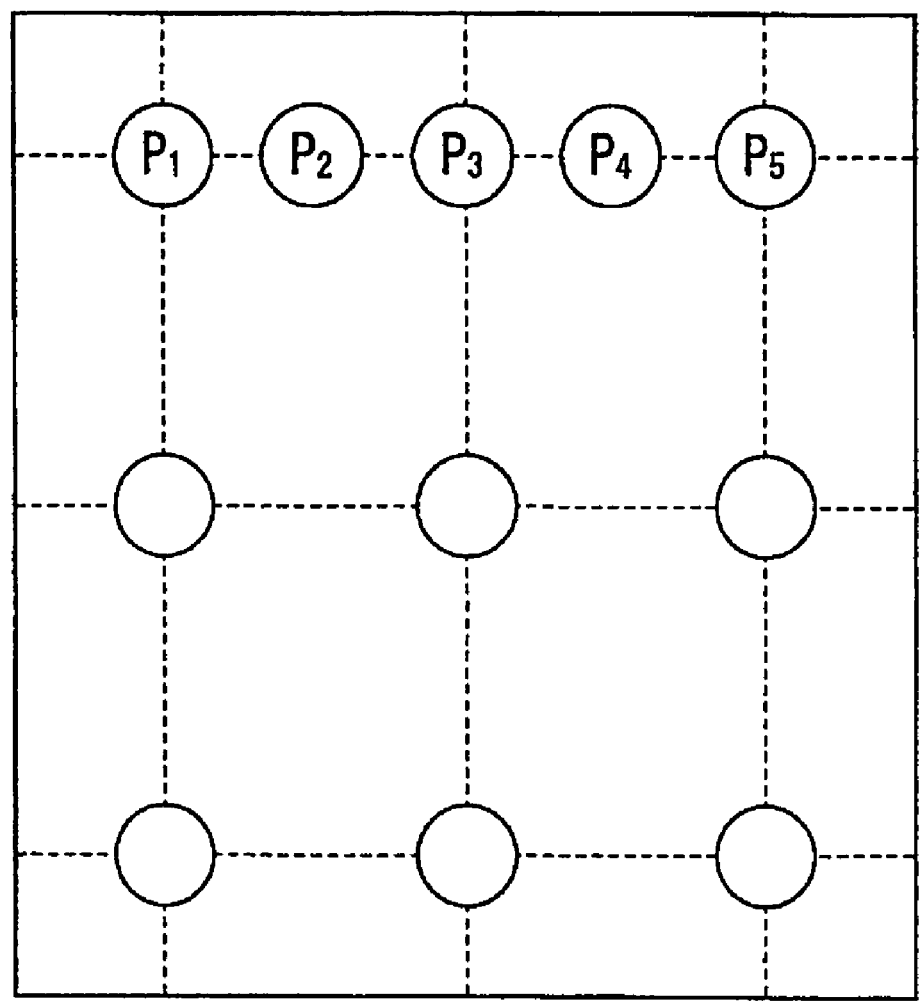
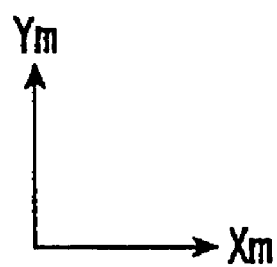

SURFACE-PROFILE MEASURING INSTRUMENT

BACKGROUND OF THE INVENTION

1. Field of the Invention

The present invention relates to a surface-profile measuring instrument.

More specifically, it relates to a surface-profile measuring instrument that scans a surface of a workpiece to measure a contour, surface roughness, waviness and the like of the workpiece.

2. Description of Related Art

A surface-profile measuring instrument that scans a surface of a workpiece to obtain a three-dimensional shape of the workpiece has been known.

FIG. 19 shows an arrangement of a measuring system 100 (surface-profile measuring instrument) using a scanning probe 130.

The measuring system 100 includes a coordinate measuring machine 110 that moves scanning probe 130, a manually-operated console 150, a motion controller 160 for controlling the movement of the coordinate measuring machine 110 and a host computer 200 that drives the coordinate measuring machine 110 via the motion controller 160 and processes the measurement data obtained by the coordinate measuring machine 110 to acquire the dimension and shape of a workpiece W.

The coordinate measuring machine 110 includes a base 111, a drive mechanism 120 vertically mounted on the base 111 to move the scanning probe 130 three-dimensionally, and a drive sensor (not shown) for detecting the drive amount of the drive mechanism 120.

The drive mechanism 120 includes: two beam supporters 121 provided on both sides of the base 111, the beam supporters having a height in Zm-axis direction (approximately vertical direction) and being slidable in Ym-axis direction (along the sides of the base 111); a beam 122 supported on the upper ends of the beam supporters 121 and having a length in Xm-axis direction; a column 123 provided on the beam 122 in a manner slidable in Xm-axis direction, the column 123 having a guide in Zm-axis direction; and a spindle 124 provided on the column 123 to be slidable therewithin in Zm-axis direction and holding the scanning probe 130 on the lower end thereof.

The drive sensor includes a Ym-axis sensor for detecting the movement of the beam supporter 121 in Ym-axis direction, an Xm-axis sensor for detecting the movement of the column 121 in Xm-axis direction, and a Zm-axis sensor for detecting the movement of the spindle 124 in Zm-axis direction.

As shown in FIG. 20, the scanning probe 130 includes a stylus 131 with a probe (measurement portion) 132 at the tip end thereof and a support 133 that supports the base end of the stylus 131 in a manner slidable in Xp direction, Yp direction and Zp direction.

The support 133 includes a slide mechanism (not shown) having an xp slider, yp slider and zp slider (not shown) and a probe sensor (not shown) for detecting the displacement of the slide mechanism in the respective axis directions and outputting the detected displacement.

The stylus 131 is supported by the slide mechanism in a manner slidable within a predetermined range relative to the support 133.

Such arrangement of the scanning probe 130 is disclosed in, for instance, document 1 (JP 05-256640 A).

With this arrangement, while the probe 132 is in contact with the workpiece surface S by a reference pressing amount Δr, the scanning probe 130 is scan-moved along the workpiece surface S.

Then, a movement locus of the scanning probe 130 can be obtained from the drive amount of the drive mechanism 120.

The movement locus of the scanning probe 130 represents the movement locus of the probe 132. The contact point of the workpiece surface S and the probe 132 is present at a position offset from the movement locus of the center of the probe 132 by a predetermined amount (ΔQ).

The position of the scanning probe 130 detected by the drive sensor and the displacement of the stylus 131 detected by the probe sensor are summed to obtain the position of the probe 132, and the position of the probe 132 is corrected by the predetermined offset value (ΔQ) to calculate the position of the workpiece surface S.

When the workpiece surface is scanned by the surface-profile measuring instrument, inertia is applied on a part of the instrument driven with acceleration.

For instance, when the workpiece W is a circle or an arc, centrifugal force is generated by a circular movement, which deforms the drive mechanism 120 (spindle 124) as shown in FIG. 21.

When the deformation on account of the acceleration occurs, the detection value of the sensor contains error corresponding to the deformation.

For instance, when the centrifugal force is generated, the detection value of the sensor represents inner side of the circle on account of the outward deformation of the spindle 124, which results in radial deviation shown in FIG. 22.

In FIG. 22, L1 is a diameter of a ring gauge and L2 is a measurement data

Such problems become prominent when a high-speed scanning measurement is conducted by a large-size coordinate measuring instrument for measuring, for instance, a vehicle body.

In view of this, following arrangement is disclosed in Document 2 (JP 07-324928 A) for correcting the measurement error generated by acceleration.

In the Document 2, a correction value representing deflection characteristics is calculated in advance as a function of a position of a measurement slider and acceleration of the measurement slider.

For instance, a diameter-known ring gauge is measured at various positions within a measurement area with various accelerations to obtain the function of the acceleration and the deflection characteristics.

When a workpiece is measured, in addition to obtaining detection data by various sensors, the correction value is identified based on the acceleration at the time of the measurement and the detection data is corrected by the correction value.

The measurement error on account of acceleration is thus corrected to obtain an accurate measurement value.

In order to obtain the acceleration at the time of measurement, the Document 2 teaches: a method in which the measured value of the position of the measurement slider is differentiated twice (paragraph 0037, claim 12); and a method in which the acceleration of the measurement slider is detected by providing an acceleration sensor (paragraph 0047, claim 13).

According to the method of the Document 2, the position of the measurement slider is differentiated twice to identify the acceleration during the measurement However, the resolution of the acceleration deteriorates in reverse proportion to square of sampling frequency when the position detection value is differentiated twice.

For instance, if the sampling frequency for detecting the position is decupled, the resolution of the calculated acceleration is degraded to one hundredth of the original, which results in deterioration of the resolution of the correction amount by one hundredth of the original.

Accordingly, the acceleration by double differentiation of the position is not practical and cannot answer to the demand for high-speed and high-accuracy movement Further, though the acceleration of the measurement slider is obtained by differentiating the position of the measurement slider twice, the acceleration and deformation are generated on a tip end of the spindle 124 or a probe unit during the actual measurement, so that there is naturally a limit on the correction accuracy when focusing on the acceleration of the measurement slider.

Incidentally, though the Document 2 mentions to the provision of the acceleration sensor to obtain the acceleration of the measurement slider, no clear recitation for the performance and providing method are disclosed therein and the provision of acceleration sensor is practically difficult.

For instance, when a circle of 100 mm diameter is scan-measured at scanning speed of 10 mm/sec, centripetal acceleration of approximately 50 µG is generated. However, it is difficult to provide an acceleration sensor capable of detecting 50 µG acceleration for each movement axis (total three acceleration sensors) and, even more, it is impossible to provide acceleration sensors adjacent to the probe unit As discussed above, since the deformation generated during the scanning measurement cannot be accurately calculated, the deformation cannot be corrected.

Accordingly, the shape of a workpiece cannot be accurately measured during high-speed measurement. In order to accurately measure a workpiece, the scanning speed is restricted to a level without causing deformation.

Especially, since a large-size coordinate measuring instrument 110 capable of high-speed measurement of a large workpiece (such as a vehicle) is in demand, a solution for the above problem has been eagerly desired.

SUMMARY OF THE INVENTION

An object of the present invention is to provide a surface-profile measuring instrument capable of resolving the above problems and can conduct high-speed and high-accuracy scanning measurement.

A surface-profile measuring instrument according to an aspect of the present invention includes: a scanning probe including a probe to be moved toward or contacted with a workpiece surface with an arc portion on at least a part thereof, the scanning probe scanning the workpiece surface while keeping the relative position between the probe and the workpiece surface at a predetermined reference position; a scanning vector commanding unit that commands a scanning vector command indicating a next movement position of the scanning probe along the workpiece surface; a drive mechanism having a drive shaft that holds and dimensionally moves the scanning probe in accordance with the scanning vector command; a drive sensor that detects a drive amount of the drive mechanism; and a correction calculating unit that calculates a detection value of the drive sensor in accordance with the scanning vector command commanded by the scanning vector commanding unit, in which the correction calculating unit calculates a correction-amount for correcting a measurement error generated by a deformation of the drive mechanism in accordance with the movement thereof.

Incidentally, the term "with an arc portion on at least a part thereof" does not require the presence of an arc of a constant curvature. It is only required that there is some curve on the workpiece surface. Accordingly, free curve is included within the scope of the present invention.

In the above arrangement, a scanning vector command for moving the scanning probe along the workpiece surface is issued from the scanning vector commanding unit.

Then, the scanning probe is moved by the drive mechanism in accordance with the scanning vector command while scanning along the workpiece surface.

Then, the drive amount of the drive mechanism while scanning the workpiece surface with the scanning probe is detected by the drive sensor and the relative position between the probe and the workpiece surface is detected by the displacement sensor.

Acceleration is generated during the scanning measurement and, when some force is applied by the acceleration, deformation is caused on the drive mechanism, which may be contained in the measurement error.

Accordingly, simultaneously with the scanning measurement by the scanning probe, a process for correcting the error on account of the deformation is conducted.

The correction amount based on the command value of the scanning vector command is calculated by the correction-calculating unit.

In other words, the correction amount for correcting the measurement error in accordance with the deformation generated during the movement is calculated.

For instance, fluctuation of the drive mechanism is estimated based on the acceleration derived by the command value of the scanning vector command to calculate the correction amount.

The calculated correction amount is synthesized with the detection value by the drive sensor and the displacement sensor and is outputted as the measurement data.

According to the above arrangement, the correction amount is calculated based on the command value of the scanning vector command.

Accordingly, the driving condition of the drive mechanism can be obtained in detail and with accuracy, so that the correction amount for correcting the deformation generated on the driving mechanism that is under movement can be accurately calculated.

Conventionally, in obtaining the drive condition of the drive mechanism for correcting the measurement error, the drive condition is calculated based on the detection value of the drive sensor.

However, the detection value of the drive sensor contains the deformation of the drive mechanism generated when the drive mechanism is driven, where accurate correction cannot be expected with the calculation of the correction amount based on the error-containing value.

Further, when the movement state is calculated based on the detection value of the drive sensor, discretization error is enlarged if acceleration is to be calculated from, for instance, the position detection value, which is impractical.

For instance, when the sampling cycle of the position detection by the drive sensor is shortened to one tenth, the resolution of the acceleration (movement state quantity) is degraded to one hundredth thereof.

Alternatively, it is conceivable to provide an acceleration sensor in order to obtain acceleration data as the movement state. However, provision of acceleration sensors in respective Xm, Ym and Zm directions is considerably difficult and there is naturally a limit on the detection ability of the acceleration sensor.

In this regard, since the drive condition is obtained from the command value of the scanning vector command, the movement state of the drive mechanism can be obtained by calculation without relying on the actual measurement data.

Accordingly, the movement state can be accurately obtained even within a short cycle.

Consequently, the correction can be made with high resolution.

In the above aspect of the present invention, it is preferable that the correction-calculating unit includes: a correction-parameter storage that stores a correction parameter representing a relationship between acceleration caused on the scanning probe and the deformation of the drive mechanism; a correction-amount calculating unit that calculates a correction amount for correcting the detection value of the drive sensor based on the acceleration caused on the scanning probe; and a measurement data synthesizing unit that synthesizes the calculated correction-amount with the detection value of the drive sensor acquire the position of the workpiece surface.

In the above arrangement, the parameters required for correction-calculation is stored in the correction-parameter storage in advance.

The correction-amount calculating unit calculates the correction amount based on the acceleration derived by the command value of the scanning vector command and the correction parameters.

The calculated correction amount is synthesized with the detection value of the drive sensor and the displacement sensor, thereby obtaining an accurate measurement value.

The correction amount includes a phase-difference correction-amount for correcting the phase difference in command transfer generated between the respective axes on account of difference in frequency transfer characteristics or drive gain of the respective drive axes, and gain correction-amount for correcting the gain error for respective axes generated on account of deformation of the drive mechanism by acceleration.

The following arrangement is preferably employed in order to obtain the phase-difference correction-amount.

In the above aspect of the present invention, the correction-amount calculating unit preferably includes a phase-difference correction-amount calculating unit, the correction parameter storage preferably stores the correction parameters for correcting a phase difference, and the correction parameters ($b_2$, $b_1$) for correcting the phase difference is preferably calculated based on: a relational equation of $\Phi = b_2 f^2 + b_1 f + \Phi_0$ in which $\Phi$ represents a phase-difference correction amount, f represents a rotation frequency during a scanning measurement and $\Phi_0$ is an initial phase difference; and a result of scanning measurement of a circle gauge at different positions within a measurement area with different scanning velocities.

The above relational equation is established supposing that the phase-difference correction-amount interrelates to the rotation frequency for the scanning probe scans the workpiece during the scanning measurement.

A calibration data is obtained by actually measuring the circle gauge at different positions within a measuring area with different scanning velocities (rotation frequency).

The calibration data is assigned to the above relational equation to calculate a parameter, which is stored as the correction parameter.

By calculating the correction parameter for correcting the phase difference in accordance with the difference in the rotation frequency and the measured position, the phase difference can be corrected.

Accordingly, accurate measurement data can be obtained by correcting the phase error during the circular movement.

In order to calculate the gain correction-amount, following arrangement is possible.

The parameter associating the acceleration and gain error may be obtained using a relational equation supposing that the gain error is proportional to the acceleration.

In the above aspect of the present invention, the correction-amount calculating unit preferably includes a gain correction-amount calculating unit, the correction parameter storage preferably stores the correction parameter for correcting a gain, and the correction parameter for correcting the gain is preferably calculated based on: a relational equation of $D = k \cdot A$, in which a gain correction-amount is D and the acceleration of the movement of the scanning probe during the scanning measurement is A; and a result of the scanning measurement of the circle gauge at different positions within the measurement area with different scanning velocities.

Alternatively, the parameter associating the rotation frequency and gain error may be obtained using a relational equation supposing that the gain error is proportional to the rotational frequency.

In the above aspect of the present invention, the correction-amount calculating unit preferably includes a gain correction-amount calculating unit, the correction parameter storage preferably stores the correction parameters for correcting a gain, and the correction parameters for correcting the gain is preferably calculated based on: a relational equation of $|G_1| = 1 - k(2\pi \cdot f)^2$, in which $|G_1|$ represents a gain of a frequency transfer characteristics $G_1$ and f is a rotation frequency during the scanning measurement; and a result of the scanning measurement of the circle gauge at different positions within the measurement area with different scanning velocities.

Further alternatively, the relationship between the gain error and the rotation frequency may be empirically obtained.

In the above aspect of the present invention, the correction-amount calculating unit preferably includes a gain correction-amount calculating unit, the correction parameter storage preferably stores the correction parameters for correcting a gain, and the correction parameters for correcting the gain preferably is a coefficient of a polynomial equation derived by a relationship between the rotation frequency and the gain derived by a result of the scanning measurement of the circle gauge at different positions within the measurement area with different scanning velocities.

Though the command value of the scanning vector command is used as the correction calculation in the present invention, the movement state of the drive mechanism and the scanning probe may be estimated based on the scanning vector command value and the correction calculation may be conducted based on the estimated value instead of directly employing the command value of the scanning vector command.

Specifically, in the above aspect of the present invention, the profile measuring instrument preferably includes: a movement-estimating unit that estimates a movement condition of the drive mechanism based on the scanning vector command issued by the scanning vector commanding unit to calculate an estimated movement state quantity, the movement-estimating unit including: a nominal-model setting unit that is set with a nominal model of a frequency transfer characteristics from the scanning vector commanding unit to the probe of the scanning probe; a position-estimating unit that acquires the position of the scanning probe as an estimated position using the scanning vector command from the scanning vector commanding unit and the nominal model set in the nominal-model setting unit; and a second-order differentiating unit that second-order differentiates the estimated position of the scanning probe acquired by the position-estimating unit to calculate the acceleration as the estimated movement state quantity, in which the correction calculating unit calculates a correction-amount for correcting a measurement error generated by a deformation of the drive mechanism in accordance with the movement thereof based on the estimated movement state quantity.

According to the above arrangement, the scanning vector command from the scanning vector commanding unit is inputted to the position-estimating unit Then, the position command C by the scanning vector command is multiplied with the preset nominal model $G_N$ by the position-estimating unit to calculate the estimated position E of the scanning probe.

The calculated estimated position E is outputted to the second-order differentiating unit.

The second-order differentiating unit calculates the acceleration data based on the estimated position of the scanning probe as the estimated movement state quantity.

The acceleration data is outputted to the correction-amount calculating unit, where the correction amount for correcting the measurement error in accordance with the deformation of the drive mechanism generated by the drive operation is calculated.

The calculated correction amount is synthesized with the detection value by the drive sensor and the displacement sensor and is outputted as the measurement data.

According to the above arrangement, the acceleration applied on the scanning probe can be calculated as the estimated movement state quantity.

When the acceleration is calculated based on the actual positional data, the resolution of the acceleration data is degraded as the sampling cycle becomes short However, since the acceleration is calculated by conducting second-order differential on the estimated position calculated by the nominal model, the acceleration data is not degraded on account of the sampling cycle.

Accordingly, the acceleration data can be calculated with a short cycle and the correction amount can be minutely calculated based on thus calculated acceleration data.

Consequently, positional data obtained with a short cycle can be accurately corrected based on the movement state thereof, so that a crate profile data with a short pitch can be obtained.

According to the above arrangement, since the rotation frequency when a circle is scan-measured based on the estimated acceleration calculated by the second-order differentiating unit is calculated by the frequency-estimating unit, the rotation frequency that changes during the scanning movement of the circle can be accurately obtained.

For instance, when a command for scan-measuring a circle with a rotation velocity of rotation frequency f is issued by the scanning vector commanding unit, since the commanded velocity is not reached immediately after starting the movement and before stabilizing the velocity, commanded rotation frequency f cannot be attained.

Accordingly, if the correction amount is calculated on the basis of the commanded rotation frequency f, accurate correction cannot be achieved.

In the present invention, the rotation frequency f of the command value is not used as the basis of the correction calculation. The rotation frequency f per each time is calculated based on the estimated acceleration after conducting acceleration estimation by the second-order differential.

Consequently, the rotation frequency that changes during the scanning movement of a circle can be accurately obtained, so that accurate correction is possible even when the centrifugal force during circular movement is to be compensated by the correction calculating based on the rotation frequency.

Further, it takes some time for the rotation frequency to reach the commanded level during scan-measurement of a circle. Accordingly, when a correction on the basis of the commanded rotary frequency is conducted, accurate measurement can be obtained by correcting the data acquired when the scanning velocity (i.e. the rotation frequency) becomes constant without employing the data acquired while the scanning velocity is accelerated.

However, the process requires extra time before the scanning velocity (i.e. rotation frequency) becomes constant, which considerably deteriorates the measurement work efficiency.

On the other hand, since the rotation frequency f is calculated from the estimated acceleration per each moment and the correction amount can be calculated based on the calculated rotation frequency f, all of the acquired data can be appropriately corrected to obtain the measurement data without waiting for the scanning velocity (i.e. rotation frequency) to reach a constant level.

Consequently, the measurement work efficiency can be improved.

BRIEF DESCRIPTION OF THE DRAWINGS

FIG. 6 is an illustration showing how to conduct a scanning measurement of a circle at a plurality of points from $P_1$ to $P_5$ in order to acquire calibration data.

DETAILED DESCRIPTION OF PREFERRED EMBODIMENT(S)

Exemplary embodiments of the present invention will be described below with reference to the attached figures and signs attached to respective elements in the figures.

First Embodiment

A surface-profile measuring instrument according to a first embodiment of the invention will be described below.

Figure 20:
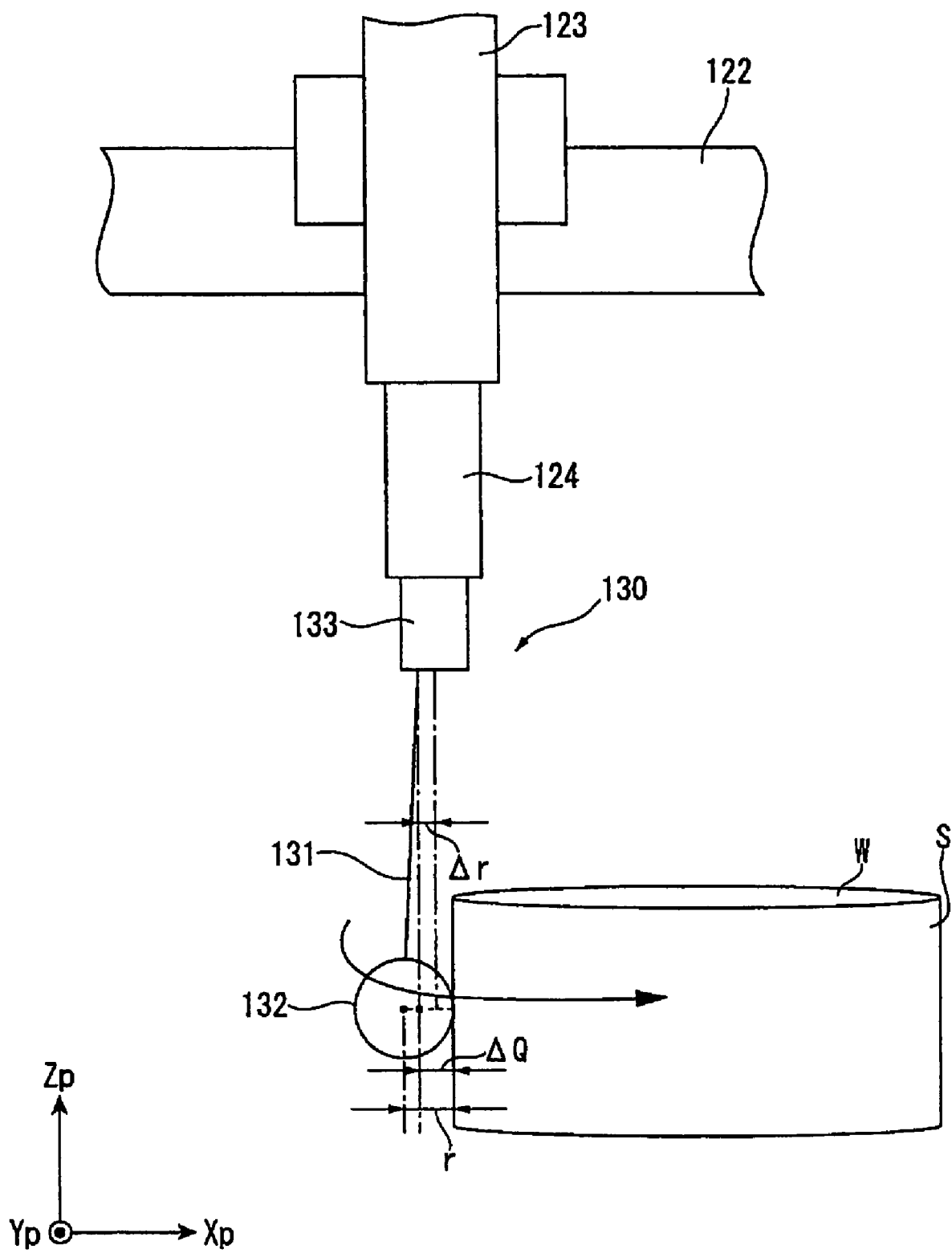
FIG. 20 is an illustration showing an arrangement of a scanning probe and how to measure a workpiece surface with the scanning probe.

FIG. 20 shows a measurement system (surface-profile measuring instrument) using a scanning probe 130 of the first embodiment.

Figure 1:
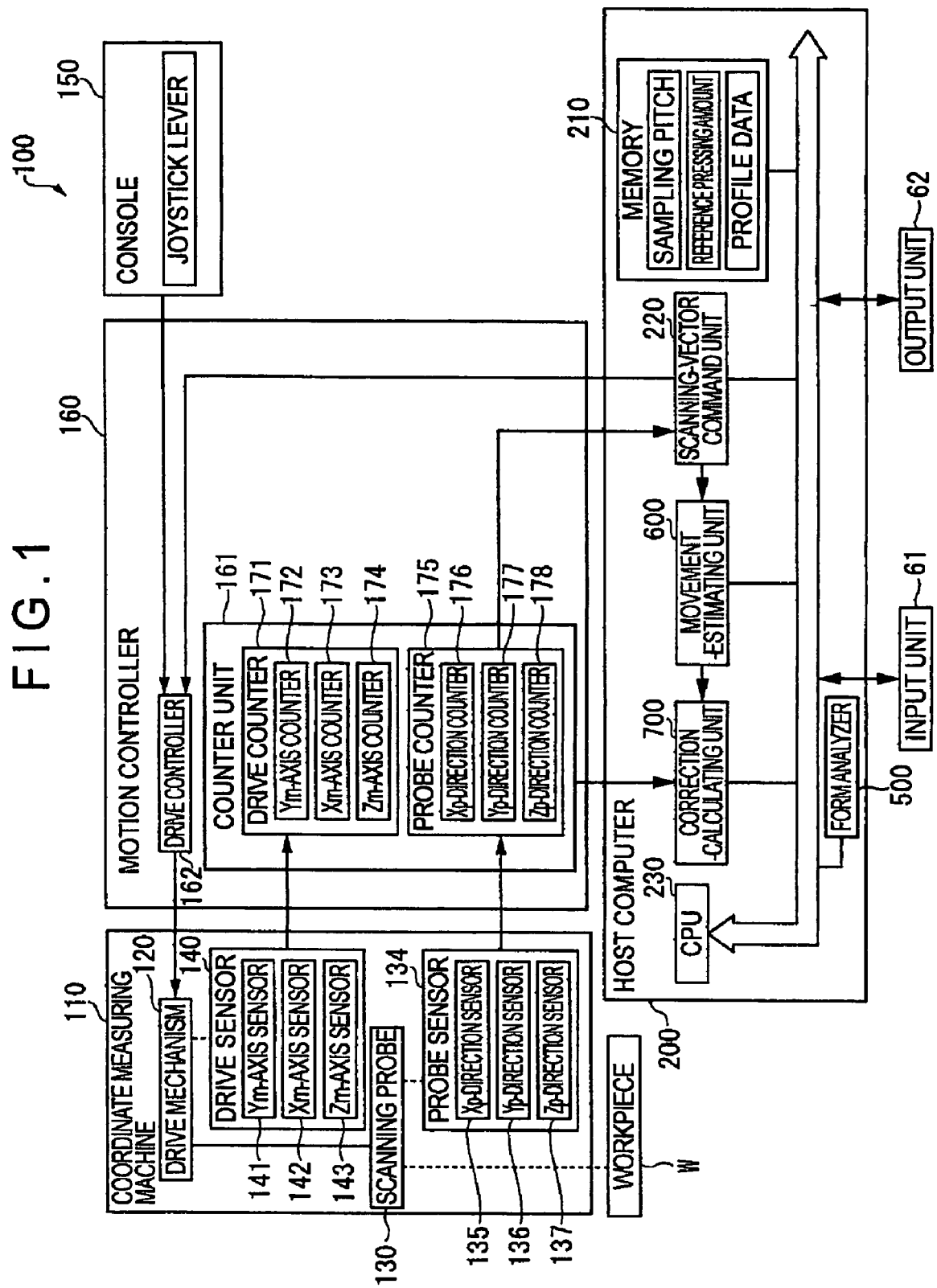
FIG. 1 is a functional block diagram of a measurement system according to a first embodiment of the present invention.

FIG. 1 is a functional block diagram of the measurement system 100.

Schematic arrangement of the measurement system 100 is the same as those described in the background section, which includes: a coordinate measuring machine 110; a console 150 for manually operating the movement of the coordinate measuring machine 110; a motion controller 160 for controlling a drive of the coordinate measuring instrument 110; a host computer 200 that send a predetermined command to the motion controller 160 and executes processing such as form analysis of a workpiece W; an input unit 61 for inputting a measurement condition and the like; and an output unit 62 for outputting the measurement result.

Figure 19:
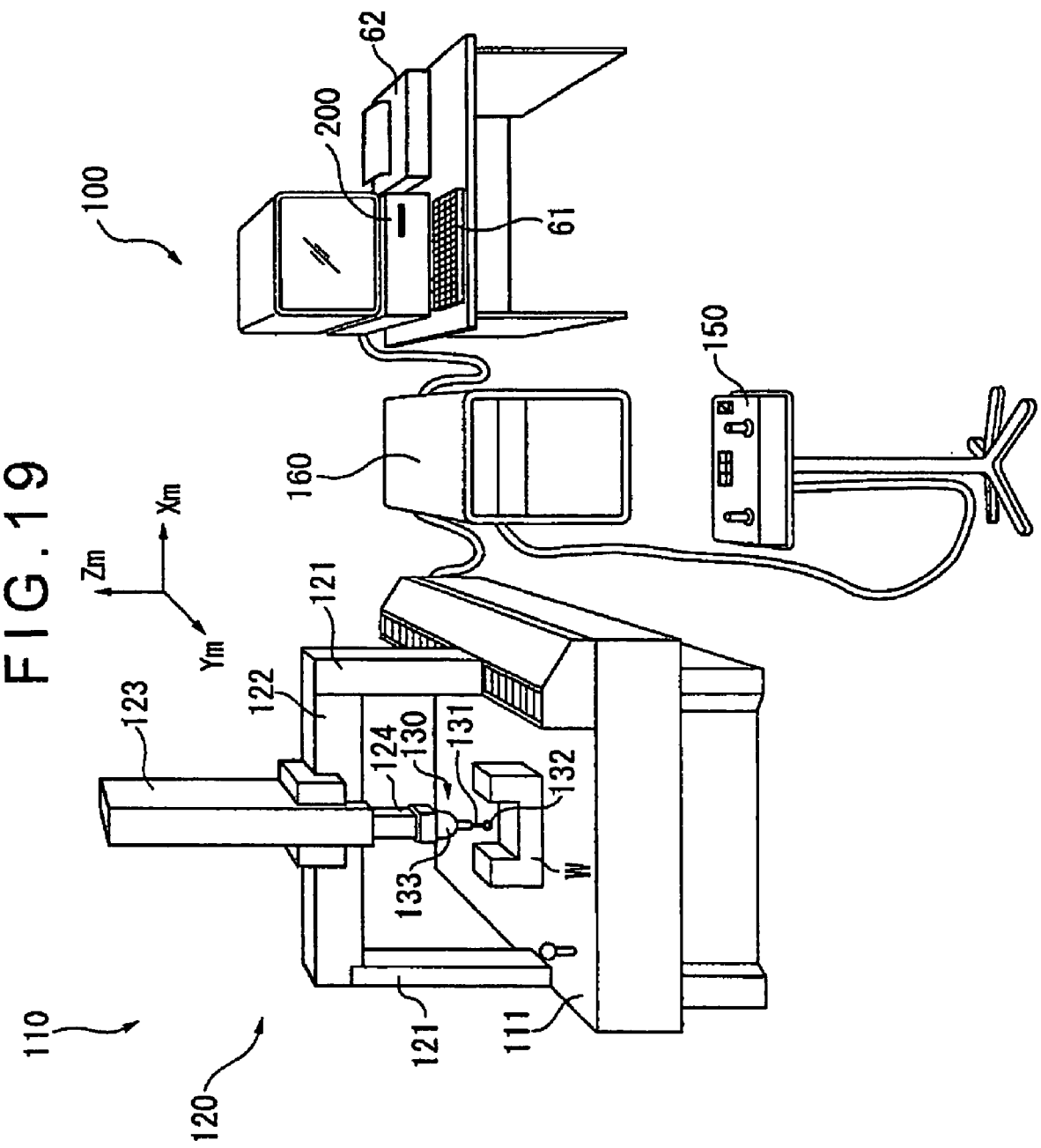
FIG. 19 shows an arrangement of a measurement system (surface-profile measuring instrument) using a scanning probe of a related art.

The coordinate measuring machine 110 (see FIG. 19) includes a base 111, a drive mechanism 120 vertically mounted on the base 111 to move the scanning probe 130 three dimensionally, and a drive sensor 140 for detecting the drive amount of the drive mechanism 120.

The drive mechanism 120 includes: two beam supporters 121 provided on both sides of the base 111, the beam supporters having a height in Zm-axis direction (approximately vertical direction) and being slidable in Ym-axis direction (along the sides of the base 111); a beam 122 supported on the upper ends of the beam supporters 121 and having a length in Xm-axis direction; a column 123 provided on the beam 122 in a manner slidable in Xm-axis direction, the column 123 having a guide in Zm-axis direction; and a spindle 124 provided on the column 123 to be slidable therewithin in Zm-axis direction and holding the scanning probe 130 on the lower end thereof.

The drive sensor includes a Ym-axis sensor 141 for detecting the movement of the beam supporter 121 in Ym-axis direction, an Xm-axis sensor 142 for detecting the movement of the column 121 in Xm-axis direction, and a Zm-axis sensor 143 for detecting the movement of the spindle 124 in Zm-axis direction.

The scanning probe 130 (see FIG. 20) includes a stylus 131 with a probe (measurement portion) 132 at the tip end thereof and a support 133 that supports the base end of the stylus 131 in a manner slidable in Xp direction, Yp direction and Zp direction.

The support 133 includes a slide mechanism (not shown) having an xp slider, yp slider and zp slider (not shown) and a probe sensor 134 for detecting the displacement of the slide mechanism in the respective axis directions and outputting the detected displacement.

The probe sensor 134 includes a Xp-direction sensor 135 for detecting the movement of the stylus 131 in Xp-direction, a Yp-direction sensor 136 for detecting the movement of the stylus 131 in Yp-direction and a Zp-direction sensor 137 for detecting the movement of the stylus 131 in Zp-direction.

The motion controller 160 includes a counter unit 161 for counting the detection signal from the drive sensor 140 and the probe sensor 134, and a drive control circuit 162 for controlling the drive mechanism 120 in accordance with the command from the host computer 200 and the console 150.

The counter unit 161 includes a drive counter 171 that counts a pulse signal outputted by the drive sensor 140 to measure the drive amount of the drive mechanism 120, and a probe counter 175 that counts the pulse signal outputted by the probe sensor 134 to measure the slide amount of the stylus 131 as a pressing amount.

The drive counter 171 includes a Ym-axis counter 172 that counts an outputted from the Ym-axis sensor 141, an Xm-axis counter 173 that counts an output from the Xm-axis sensor 142, and a Zm-axis counter 174 that counts an output from the Zm-axis sensor 143.

The probe counter 175 includes an Xp-direction counter 176 that counts an output from the Xp direction sensor 135, a Yp-direction counter 177 that counts an output from the Yp direction sensor 136 and a Zp-direction counter 178 that counts an output from the Zp direction sensor 137. The count value Xm, Ym, Zm) of the drive counter 171 and a count value (Xp, Yp, Zp) of the probe counter 175 are respectively outputted to the host computer 200.

The host computer 200 includes: a memory (storage) 210 that stores a measurement condition and the like set by the input unit 61; a scanning vector command unit 220 that commands a scanning movement direction and moving velocity along the workpiece surface; a movement-estimating unit 600 that estimates the movement of the drive mechanism 120 based on the command of the scanning vector commanding unit 220 to calculate the acceleration generated on the scanning probe 130; a correction-calculating unit 700 that calculates the correction amount based on the movement estimation by the movement-estimating unit 600; a form analyzer 500 for analyzing the shape of the workpiece W; a central processing unit (CPU) 230 provided with an arithmetical unit and a storage (ROM, RAM) to execute a predetermined program and to conduct data-processing; and a bus that connects the above respective units.

The memory 210 stores the measurement condition and the like inputted by the input unit 61, which includes, for instance, an interval (sampling pitch) for sampling the drive amount of the drive mechanism during the scanning measurement, an amount for the probe 132 to be pressed toward the workpiece W (reference pressing amount Δr), speed for conducting profile-scanning (scanning velocity), and a profile data based on design data of the workpiece W and the like.

The scanning vector commanding unit 220 generates a scanning vector command for scanning the workpiece W based on, for instance, the profile data set in the memory 210.

The scanning vector commanding unit 220 also generates a scanning vector command in pressing direction for setting the pressing amount within a predetermined range (reference position range) at the reference pressing amount Δr.

The scanning vector command generated by the scanning vector commanding unit 220 is outputted to the drive control circuit 162.

Figure 2:
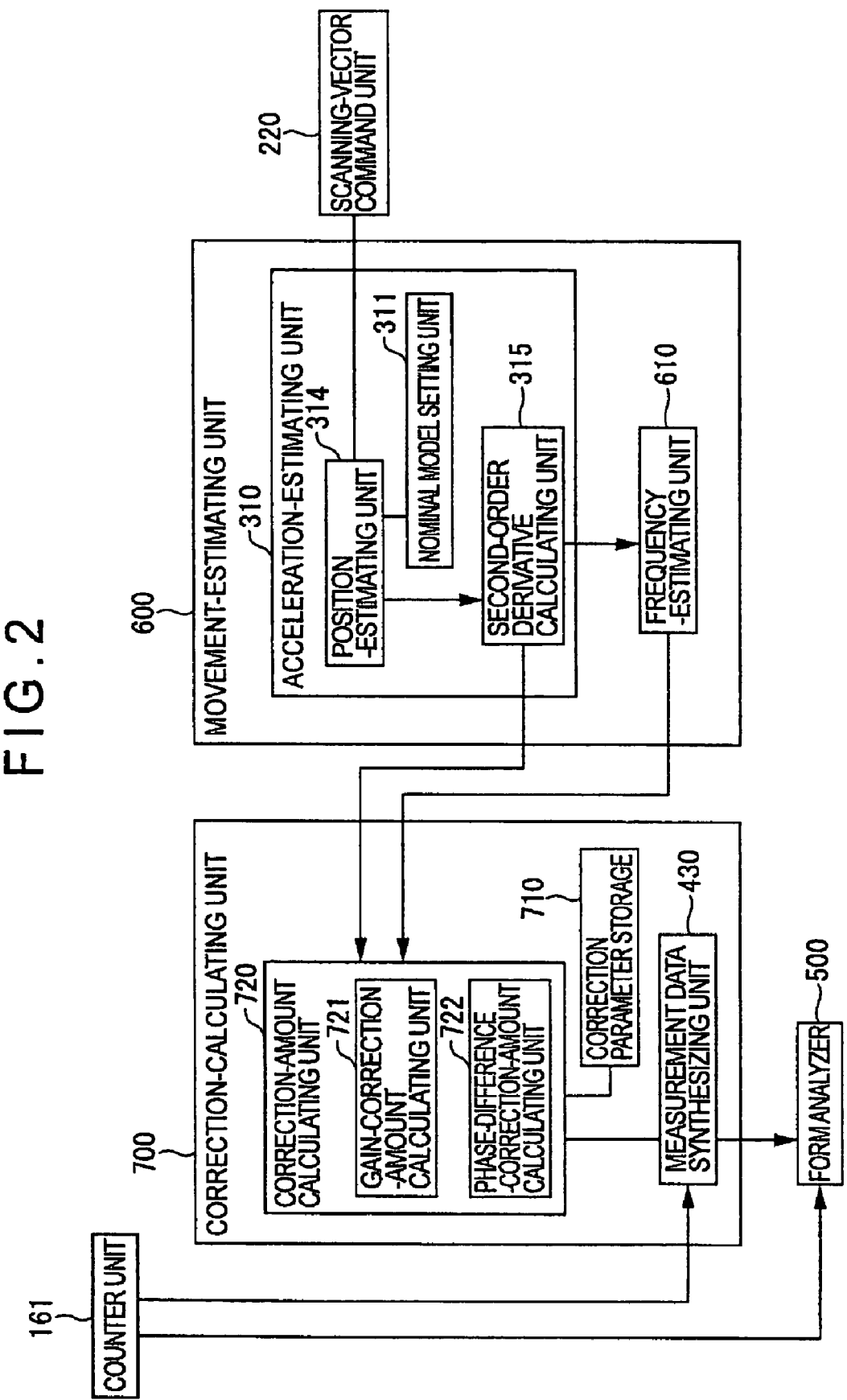
FIG. 2 is an illustration showing an arrangement of a movement-estimating unit and a correction-calculating unit of the first embodiment.

FIG. 2 is an illustration showing an arrangement of the movement-estimating unit 600 and the correction-calculating unit 700.

The movement-estimating unit 600 includes an acceleration-estimating unit 310 and a frequencyestimating unit 610.

The acceleration-estimating unit 310 includes a nominal model setting unit 311 in which a nominal model i.e. a frequency transfer function from the scanning vector commanding unit 220 to the probe of the scanning probe 130 is set, a position-estimating unit 314 that estimates the position of the scanning probe 130 based on the scanning vector command and the nominal model, and a second-order differentiating unit 315 for calculating the acceleration of the scanning probe 130 from the data value of the estimated position obtained by the position-estimating unit 314 using a second-order differential.

Figure 3:
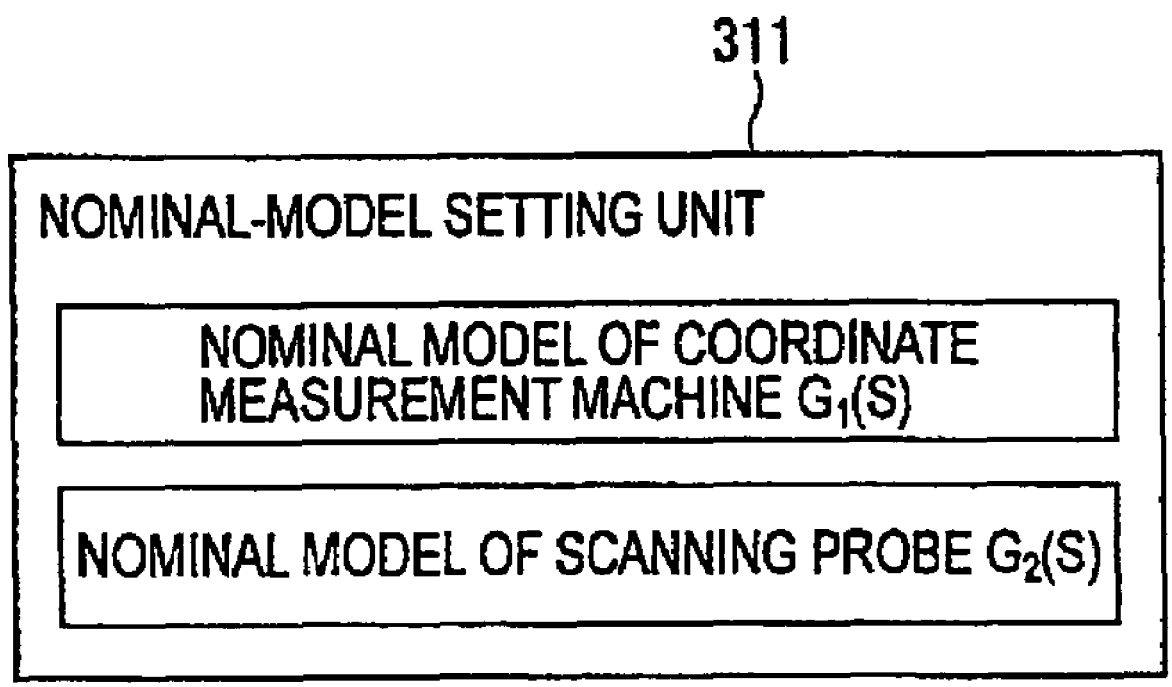
FIG. 3 is an illustration showing an arrangement of a nominal-model setting unit.

FIG. 3 is an illustration showing an arrangement of the nominal-model setting unit.

In the nominal model setting unit 311, the nominal model as a frequency transfer function from the scanning vector commanding unit 220 to the probe (measurement portion) of the scanning probe 130 is set.

As shown in FIG. 3, a nominal model $G_1(s)$ of the coordinate measuring machine (nominal model of drive mechanism) and a nominal model $G_2(s)$ of the scanning probe are set in the nominal model 311.

The nominal model of the scanning probe is provided for each type of the scanning probe 130 in preparation for exchanging the scanning probe 130, where the nominal model corresponding to the currently attached scanning probe 130 can be selected.

The transfer function from the scanning vector command to the position of the scanning probe 130 is represented as $G_N$ (=$G_1(s)*G_2(s)$), i.e. the product of the nominal model $G_1(s)$ of the coordinate measuring instrument and the nominal model $G_2(s)$ of the scanning probe.

Incidentally, though the vector commanding, drive of the coordinate measuring machine 110 and position detection by a sensor are conducted for each of Xm-axis, Ym-axis and Zm-axis, since a position control system (feedback control system for detecting the position based on the scanning vector command) is adjusted so that all of time constant T in driving the Xm, Ym and Zm-axis directions become the same, the same nominal model $G_N$ are set for Xm, Ym and Zm-axis directions.

The nominal model $G_N$ is obtained by a design data, an experiment value and the like.

For instance, when the nominal model $G_N$ is a first-order lag system, the nominal model GN is represented by the following equation, where K represents gain and s represents Laplace operator.

$$G_N = K \cdot \frac{1}{1 + T \cdot s}$$

The position-estimating unit 314 estimates the position of the scanning probe 130 based on the position command C ($c_x$, $c_y$, $c_z$) of the scanning vector command and the nominal model $G_N$.

The scanning vector command generated by the scanning vector commanding unit 220 is inputted every moment into the position-estimating unit 314.

The estimated position E ($e_x$, $e_y$, $e_z$) of the scanning probe 130 is calculated based on the position command C ($c_z$, $c_y$, $c_z$) and the nominal model $G_N$ as follows.

Specifically, the estimated position E of the scanning probe 130 is represented by a product of the nominal model $G_N$ and the position command C.

$$E = G_N \cdot C$$

The estimated position is represented after being decomposed in respective directions (Xm-axis direction, Ym-axis direction, Zm-axis direction), as follows.

$$e_x = G_N \cdot c_x$$

$$e_y = G_N \cdot c_y$$

$$e_x = G_N \cdot c_z$$

The second-order differentiating unit 315 conducts second-order differential on the estimated position E ($e_x$, $e_y$, $e_z$) of the scanning probe 130 calculated by the position-estimating unit 314 to acquire the acceleration A ($a_x$, $a_y$, $a_z$) generated on the scanning probe 130 as an estimated movement state quantity.

$$A(t) = \frac{d^2 E(t)}{dt^2}$$

$$a_x = \ddot{e}_x$$

$$a_y = \ddot{e}_y$$

$$a_z = \ddot{e}_z$$

The frequency-estimating unit 610 estimates the rotation frequency f when a circle is scan-measured with a constant angular velocity using the scanning probe 130.

Here, since the acceleration A is calculated by the second-order differentiating unit 315, the acceleration A ($a_x$, $a_y$, $a_z$) calculated by the second-order differentiating unit 315 is input into the frequency-estimating unit 610.

When the radius of the circular scanning measurement in accordance with the scanning vector command is Rs and the estimated acceleration of the scanning probe 130 calculated by the second-order differentiating unit 315 is A ($a_x$, $a_y$, $a_z$), the frequency-estimating unit 610 calculates the rotation frequency f of the circular movement according to the following equation:

$$f = \sqrt{\frac{\sqrt{a_x^2 + a_y^2 + a_z^2}}{(2\pi)^2 \cdot Rs}}$$

How to derive the equation can be, for instance, explained as follows.

The relationship between the rotation frequency f and the angular velocity $\omega$ can be expressed as $\omega=2\pi f$ and, when centripetal acceleration is represented as $a_n$, since $an=R_s\omega^2$, the equation can be derived by the following equation transformation.

$$f = \frac{\omega}{2\pi}$$

here, $a_n = Rs \cdot \omega^2$ $$\omega = \sqrt{\frac{a_n}{Rs}}$$

$$= \sqrt{\frac{\sqrt{a_x^2 + a_y^2 + a_z^2}}{Rs}}$$

accordingly, $$f = \frac{1}{2\pi}\sqrt{\frac{\sqrt{a_x^2 + a_y^2 + a_z^2}}{Rs}}$$

$$= \sqrt{\frac{\sqrt{a_x^2 + a_y^2 + a_z^2}}{(2\pi)^2 \cdot Rs}}.$$

When a circular movement on an XY plane is at issue, the above equation can be simplified as follows.

$$f = \sqrt{\frac{\sqrt{a_x^2 + a_y^2}}{(2\pi)^2 \cdot Rs}}$$

The correction-calculating unit 700 includes: a correction-parameter storage 710 that stores a correction parameter indicating a relationship between the acceleration generated on the scanning probe 130 and the deformation of the coordinate measuring machine 110; a correction-amount calculating unit 720 that calculates a correction-amount D for correcting the sensor detection value based on the acceleration generated on the scanning probe 130; and a measurement data synthesizing unit 430 for synthesizing the calculated correction amount D and the sensor detection value to acquire the position of the workpiece surface S.

The correction-parameter storage 710 stores a correction parameter P.

The correction parameter P is a parameter that associates the deformation generated on the coordinate measuring machine 110 when the acceleration A works on the scanning probe 130 (specifically, the deformation generated on the column 123 and the spindle 124) with the acceleration A.

The correction parameter P ($p_x$, $p_y$, $p_z$) is set for each axis direction, i.e. for Xm, Ym and Zm-axis directions.

The setting process of the correction parameter P will be described in the below-mentioned modifications 1, 2 and 3 with reference to a circular movement.

The correction-amount calculating unit 720 includes a gain correction-amount calculating unit 721 and a phase-difference correction-amount calculating unit 722.

The acceleration A calculated by the movement-estimating unit 600 is input into the gain correction-amount calculating unit 721.

The gain correction-amount calculating unit 721 calculates the correction amount D using the correction parameter P stored in the correction parameter storage 710 as follows.

$D = P \cdot A$ $d_x = p_x \cdot a_x$ $d_y = p_y \cdot a_y$ $d_z = p_z \cdot a_z$ The phase-difference correction-amount calculating unit 722 calculates the phase difference of the command transmission between the respective axes generated during the circular movement on account of difference in the frequency transfer characteristics or drive gain for each drive-axes direction as a phase-difference correction-amount $\Phi$.

The phase-difference correction-amount $\Phi$ is represented as a function of the rotation frequency f (for instance, $\Phi = b_2 f^2 + b_1 f + b_0$), for which correction parameters theoretically or empirically acquired are stored in the correction parameter storage 710.

Incidentally, how to set the correction parameters for calculating the gain correction amount D and the phase-difference correction-amount $\Phi$ will be described in the below modifications 1, 2 and 3 with reference to specific examples.

The measurement data synthesizing unit 430 synthesizes: the detection value (xm, ym, zm) of the drive sensor 140; the correction amount D ($d_x$, $d_y$, $d_z$) and the phase-difference correction-amount $\Phi$ calculated by the correction-amount calculating unit 720; and the detection value ($x_p$, $y_p$, $z_p$) by the probe sensor 134, to calculate the locus of the probe 132 of the scanning probe 130.

Further, the positional data of the workpiece surface S is obtained considering the reference pressing amount $\Delta r$.

The data synthesis by the measurement data synthesizing portion 430 will be described below.

For the convenience of explanation, a measurement of a workpiece surface by a circular scanning movement on the XY plane will be described below.

When the central coordinate of the circular movement is ($x_0$, $y_0$) and the radius of a circle is represented by R, the detection value ($x_m$, $y_m$) of the drive sensor 140 is represented using a predetermined phase $\theta$, as follows.

$x_m = x_0 + R \cos\theta$ $y_m = y_0 + R \sin\theta$

The detection value after applying the calculated gain correction amount ($d_x$, $d_y$) and the phase difference correction-amount $\Phi$ is represented as follows, where $x_m'$, $y_m'$ represent the corrected detection value of the drive sensor.

$x_m' = x_0 + R\cos\theta + d_x$ $y_m' = y_0 + R\sin(\theta+\phi) + d_y$

The surface position of the workpiece is determined at the position of the contact portion 132 acquired by synthesizing the corrected detection value ($x_m'$, $y_m'$) of the drive sensor 140 and the detection value of the probe sensor 134 after reflecting the reference pressing amount Δr.

The calculated positional data of the workpiece surface S is outputted to the form analyzer 500.

The form analyzer 500 synthesizes the data to calculate the locus of the contact portion 132 and the profile data of the workpiece surface S.

Further, the form analyzer 500 conducts form analysis where the calculated profile data of the workpiece is compared with a design data to obtain errors, distortions and the like.

The operation of the above-arranged first embodiment will be described below.

Initially, the measuring condition is input in advance to actual measurement.

The measuring condition includes sampling pitch, reference pressing amount Δr, and the contour data of the workpiece.

Further, the nominal model $G_1(s)$ of the coordinate measuring machine and the nominal model $G_2(s)$ of the scanning probe are set in the nominal model setting section 311.

A plurality of the nominal model is prepared for the scanning probe 130, among which a nominal model corresponding to the scanning probe 130 to be used is selected.

After initiating the measurement in the above state, the scanning vector command generated by the scanning vector commanding unit 220 is outputted to the drive control circuit 162.

Then, the control signal is outputted from the drive control circuit 162 to the drive mechanism 120 to drive the drive mechanism 120.

The scanning probe 130 is scan-moved along the workpiece surface S by the drive mechanism 120 while being pressed by the reference pressing amount Δr relative to the workpiece surface S.

Figure 21:
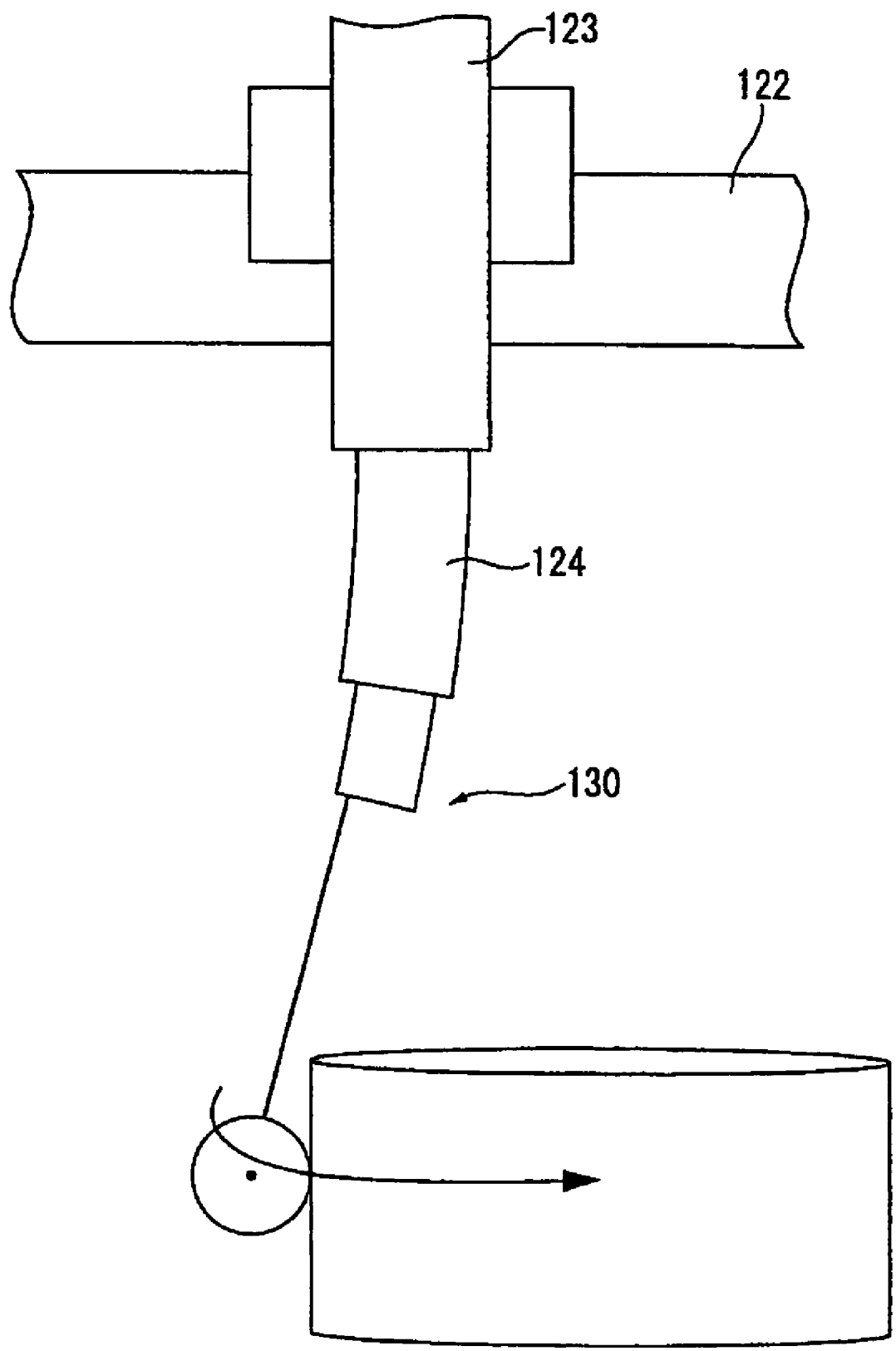
FIG. 21 is an illustration showing an error occurred on account of deformation during scanning measurement.

Acceleration is generated during the scanning movement, which causes deformation on the spindle 124 of the coordinate measuring machine 10 (see, for instance, FIG. 21).

Further, the pressing amount is controlled at the reference pressing amount Δr based on the probe counter value outputted from the probe counter 175 to the scanning vector command unit 220 during the scanning movement.

The drive amount of the drive mechanism 120 while the scanning probe 130 scans the workpiece surface S is detected by the drive sensor 140, and the displacement of the stylus 131 is detected by the probe sensor 134.

The sensor output of the drive sensor 140 is counted by the drive counter 171 and the sensor output of the probe sensor 134 is counted by the probe counter 175.

Incidentally, the data counted by the counter unit 161 is acquired at the predetermined sampling pitch.

The count value counted by the counter unit 161 (the drive counter 171 and the probe counter 175) is also outputted to the correction-calculating unit 700.

The scanning vector command from the scanning vector commanding unit 220 is sent to the drive control circuit 162 and, simultaneously therewith, also to the movement-estimating unit 600.

In the movement-estimating unit 600, the scanning vector command is inputted into the position-estimating unit 314.

The position-estimating unit 314 calculates an estimated position E(t) of the scanning probe 130 at the current time considering the frequency transfer characteristics based on the nominal model set in the nominal model setting unit 311 and the positional command of the scanning vector command.

Specifically, the estimated position E(t) ($e_x$, $e_y$, $e_z$) of the scanning probe 130 is calculated using the position command C ($c_x$, $c_y$, $c_z$) and the nominal model $G_N$ as follows.

$$e_x = G_N \cdot c_x$$

$$e_y = G_N \cdot c_y$$

$$e_z = G_N \cdot c_z$$

The estimated position E calculated by the position-estimating unit 314 is inputted into the second-order differentiating unit 315.

The second-order differentiating unit 315 calculates the acceleration A ($a_x$, $a_y$, $a_z$) generated on the scanning probe 130 at the present time using second-order differential on the calculated estimated position.

$$a_x = \ddot{e}_x$$

$$a_y = \ddot{e}_y$$

$$a_z = \ddot{e}_z$$

The acceleration A calculated by the second-order differentiating unit 315 is outputted to the correction-amount calculating unit 720 of the correction calculating unit 700.

The gain correction-amount calculating unit 721 calculates the correction-amount D per each axis for correcting the deformation caused on account of acceleration based on the inputted acceleration A and the correction parameters.

Specifically, the correction-amount D ($d_x$, $d_y$, $d_z$) of the detection value of the drive sensor when the acceleration A is generated on the scanning probe 130 is calculated as follows.

$$d_x = p_x \cdot a_x$$

$$d_y = p_y \cdot a_y$$

$$d_z = p_z \cdot a_z$$

Further, the acceleration A calculated by the second-order differentiating unit 315 is outputted to the frequency-estimating unit 610.

The rotation frequency f of the circular movement is calculated at the frequency estimating unit 610 and the calculated rotation frequency f is outputted to the phase-difference correction-amount calculating unit 722.

The phase difference correction amount Φ as the function of the rotation frequency f is calculated by the phase difference correction-amount calculating unit 722.

The calculated phase-difference correction-amount Φ is outputted to the measurement data synthesizing unit 430 together with the gain correction-amount D ($d_x$, $d_y$, $d_z$) calculated by the gain correction-amount calculating unit 721.

The measurement data synthesizing unit 430 synthesizes: the detection value ($x_m$, $y_m$, $z_m$) of the drive sensor 140; the calculated correction amount D ($d_x$, $d_y$, $d_z$) and the phase-difference correction-amount Φ; and the detection value ($x_p$, $y_p$, $z_p$) by the probe sensor 134, to calculate the position of the probe 132.

Further, the workpiece surface S is set at a position considering the predetermined reference pressing amount Δr relative to the position of the probe 132.

The obtained surface data of the workpiece W is sequentially sent to the form analyzer 500 to obtain the profile data of the workpiece surface S.

Then, a form analysis such as comparison between the profile data of the workpiece W with the design data to determine an error, distortion and the like is conducted.

Following advantages can be obtained by the above-described first embodiment.

(1) The movement estimating unit 600 includes the nominal-model setting unit 311, and the acceleration can be accurately calculated as an movement state of the drive mechanism 120 by the calculation based on the nominal model.

The correction amount is calculated by the correction-amount calculating unit 720 based on the estimated acceleration, so that the correction-amount for correcting the deformation generated on the drive mechanism 120 while the drive mechanism 120 is driven can be accurately calculated. The movement state of the drive mechanism 120 is acquired based on calculation of the nominal model without relying on actually-measured data, so that the correction can be conducted with high resolution.

(2) The phase difference between the respective drive axes is corrected based on the rotation frequency f (during the circular movement) calculated by the frequency-estimating unit 610.

Accordingly, accurate measurement data can be obtained by correcting the phase-difference error during the circular movement.

(3) Since the rotation frequency when a circle is scan-measured based on the estimated acceleration calculated by the second-order differentiating unit 315 is calculated by the frequency-estimating unit 610, the rotation frequency that changes during the scanning movement of the circle can be accurately obtained.

(4) It takes considerable time for the rotation frequency to reach the commanded level during scan-measurement of a circle. Accordingly, when a correction on the basis of the commanded rotation frequency is conducted, the measurement data has to be taken on the basis of the data acquired when the scanning velocity (i.e. the rotation frequency) is constant without employing the data acquired while the scanning velocity is accelerated.

Figure 4:
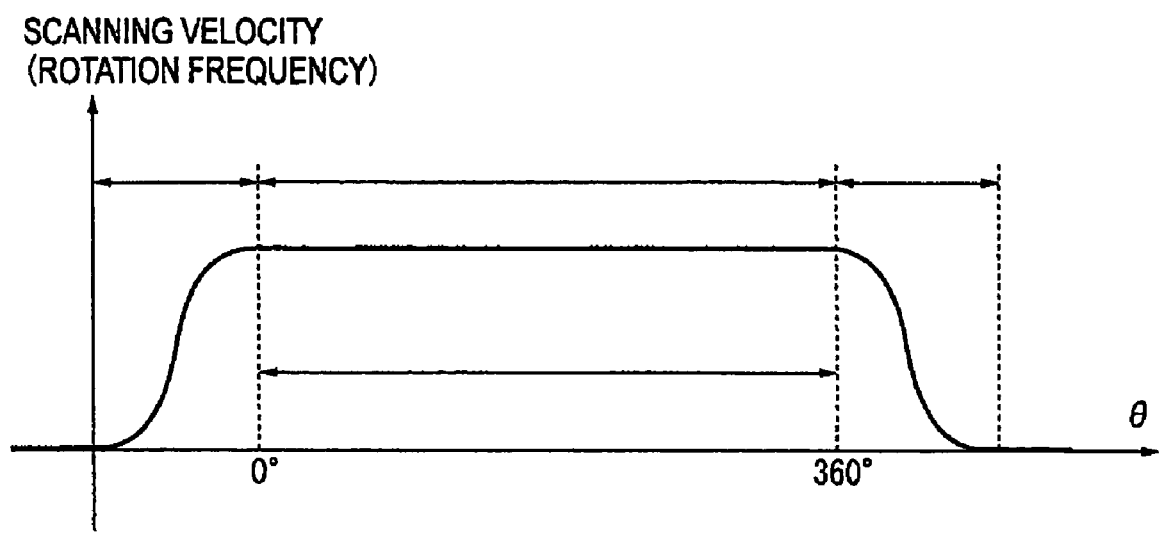
FIG. 4 is an illustration how to acquire a full-circle (360°) data when the scanning speed (or a rotation frequency) shows a constant value.

For instance, a full circle (360°) data has to be acquired when the scanning velocity (or rotation frequency) shows a constant value as shown in FIG. 4.

On the other hand, since the rotation frequency f is calculated from the estimated acceleration per each moment and the correction amount can be calculated based on the calculated rotation frequency f in the first embodiment, all of the acquired data can be appropriately corrected and the measurement data can be acquired without waiting for the scanning velocity (i.e. rotation frequency) to reach a constant level.

Figure 5:
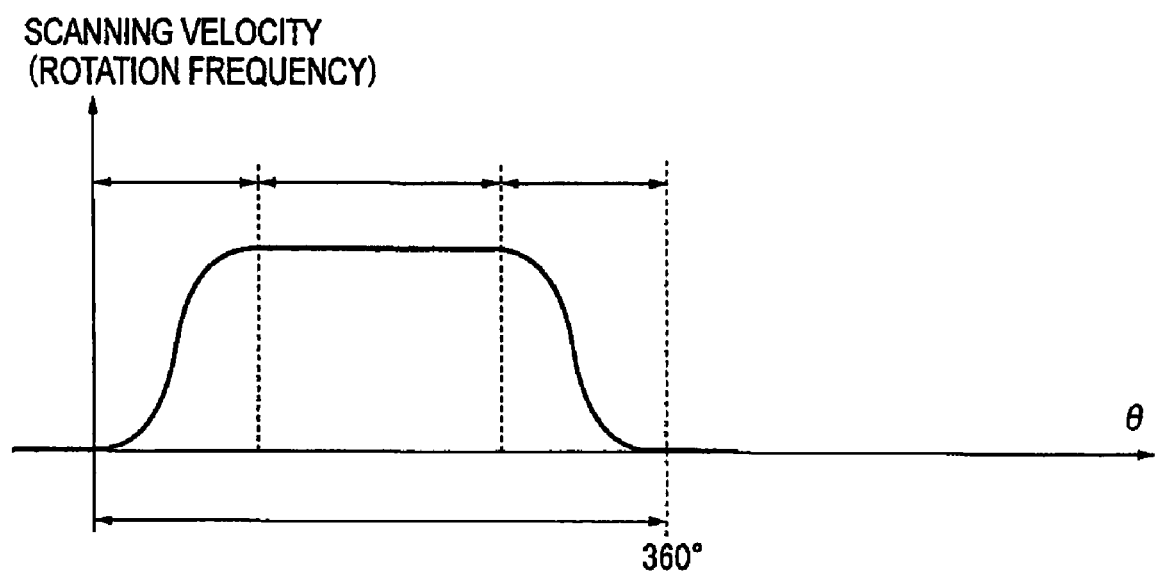
FIG. 5 is an illustration how to acquire a data in a range where the scanning speed (or a rotation frequency) changes (accelerates of decelerates).

For instance, the data acquired in an area where the scanning velocity (or rotation frequency) is changing (accelerated or decelerated) can be accurately corrected as shown in FIG. 5.

Accordingly, it is only required that full circle (360°) data is acquired on the entirety, so that the work efficiency of the measurement can be improved.

First Modification

Next, a first modification of the present invention will be described below.

The first modification is substantially the same as the above-described first embodiment, which is characterized by calculation of the correction parameters The correction amount calculated by the correction-amount calculating unit 700 of the first embodiment includes the gain correction-amount by the gain correction-amount calculating unit 721 and the phase-difference-correction amount by the phase-difference correction-amount calculating unit 722.

Initially, how to set the correction parameters for calculating the gain correction-amount will be described below.

In the first modification, following equation is established in order to acquire the correction parameters of the gain correction-amount, supposing that the deformation D of the spindle 124 interrelates to the acceleration A.

$$D = k \cdot A$$

In order to simplify the description, a circular movement on XY plane is taken as an example.

When the centripetal acceleration during the circular movement is a, the acceleration $a_x$ in Xm-axis direction can be represented as follows, where the scanning velocity is V and radius is Rs.

$$a_x = \frac{V^2}{Rs} \cdot \frac{(x - x_0)}{Rs}$$

Since the deformation on account of acceleration interrelates to the measured position, deformation $d_x$ in Xm-axis direction is expressed with reference to the acceleration $a_x$ generated in Xm-axis direction as follows while taking square term of the measured coordinates into consideration.

$$d_x = \left( \frac{V^2}{R_s} \times \frac{x - x_0}{R_s} \right) \times (\alpha_1 x^2 + \alpha_2 x + \alpha_3)$$

The equation can be transformed as follows adding the correction amount $d_y$ in Ym-axis direction and the correction amount $d_z$ in Zm-axis direction.

$$\begin{pmatrix} d_x \\ d_y \\ d_z \end{pmatrix} = \frac{V^2}{R_S} \begin{pmatrix} \alpha_1(x-x_0) & \alpha_2(x-x_0) & \alpha_3(x-x_0) \\ \alpha_4(x-x_0) & \alpha_5(x-x_0) & \alpha_6(x-x_0) \\ \alpha_7(x-x_0) & \alpha_8(x-x_0) & \alpha_9(x-x_0) \end{pmatrix} \begin{pmatrix} x^2 \\ x \\ 1 \end{pmatrix}$$

However, since the deformation D interrelates to all of the x, y and z components, the correction factor can be represented as follows.

$$\begin{pmatrix} \alpha_1 \\ \alpha_2 \\ \vdots \\ \alpha_9 \end{pmatrix} = \begin{pmatrix} \beta_1 & \beta_2 & \beta_3 \\ \beta_4 & \beta_5 & \beta_6 \\ \vdots & \vdots & \vdots \\ \beta_{25} & \beta_{26} & \beta_{27} \end{pmatrix} \begin{pmatrix} y^2 \\ y \\ 1 \end{pmatrix}$$

$$\begin{pmatrix} \beta_1 \\ \beta_2 \\ \vdots \\ \beta_9 \end{pmatrix} = \begin{pmatrix} \gamma_1 & \gamma_1 & \gamma_1 \\ \gamma_1 & \gamma_1 & \gamma_1 \\ \vdots & \vdots & \vdots \\ \gamma_1 & \gamma_1 & \gamma_1 \end{pmatrix} \begin{pmatrix} z^2 \\ z \\ 1 \end{pmatrix}$$

With the above presumption, the correction parameters can be acquired as a coefficient of a fitting curve after calculating errors by actual experiments.

The actual example is shown below.

Since the deformation on account of acceleration differs depending on the location, calibration test in order to acquire the calibration data is conducted as a scanning measurement of a circle while placing a standard gauge at a plurality of different positions at a plurality of scanning velocity (or acceleration).

For instance, the scanning measurement of a circle is conducted at a plurality of locations $P_1$ to $P_5$ shown in FIG. 6.

Incidentally, five points having the same Ym coordinate and different Xm coordinate is selected in FIG. 6 for the convenience of explanation. However, it is preferable to distribute the points evenly across Xm, Ym and Zm coordinates system within the measurement area of the measuring system 100.

Figure 7:
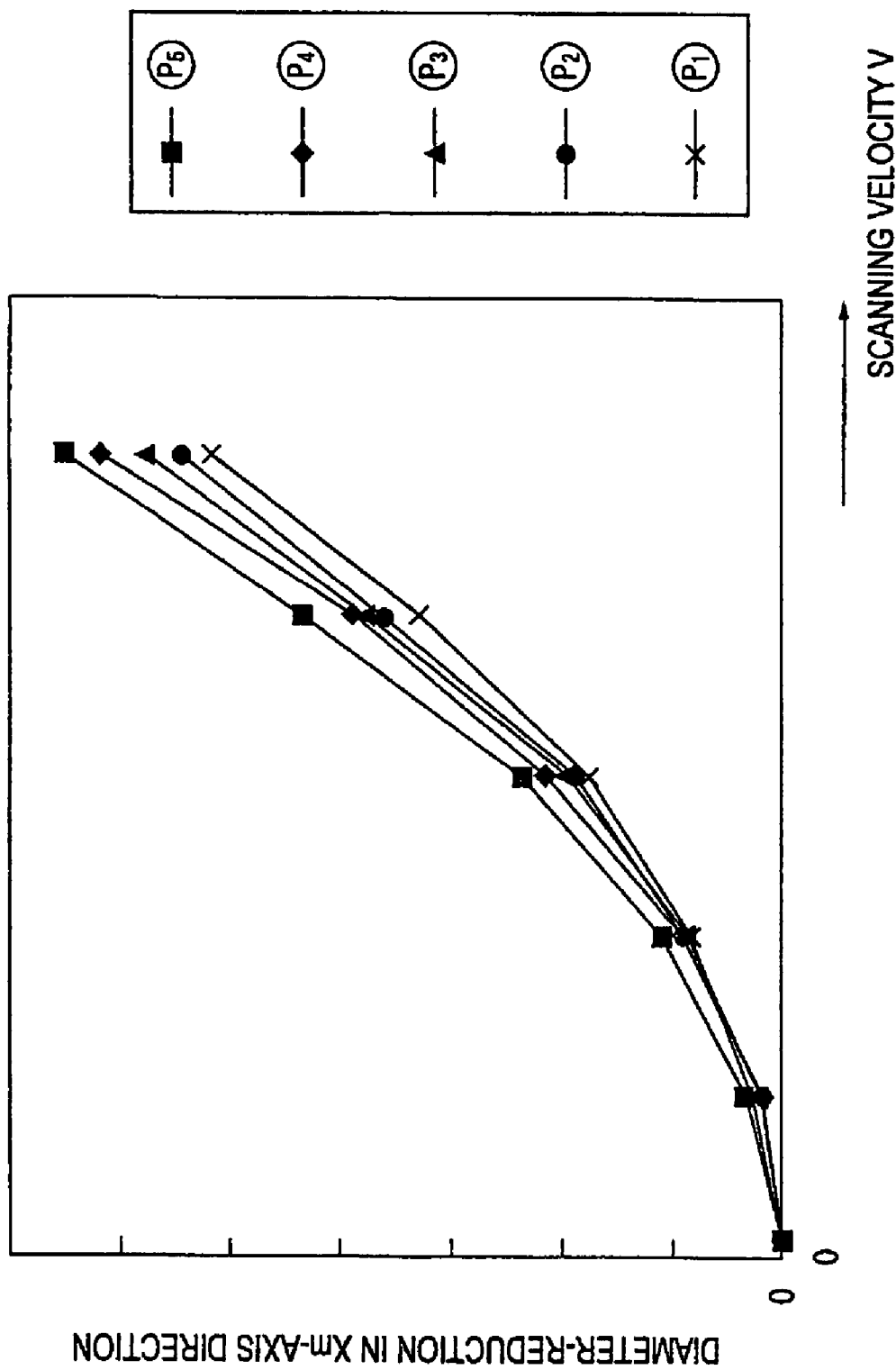
FIG. 7 is an illustration showing a relationship between a scanning velocity V and a radius decrease (radius error ΔR) when the circle is scan-measured at the respective points $P_1$ to $P_5$.
Figure 8:
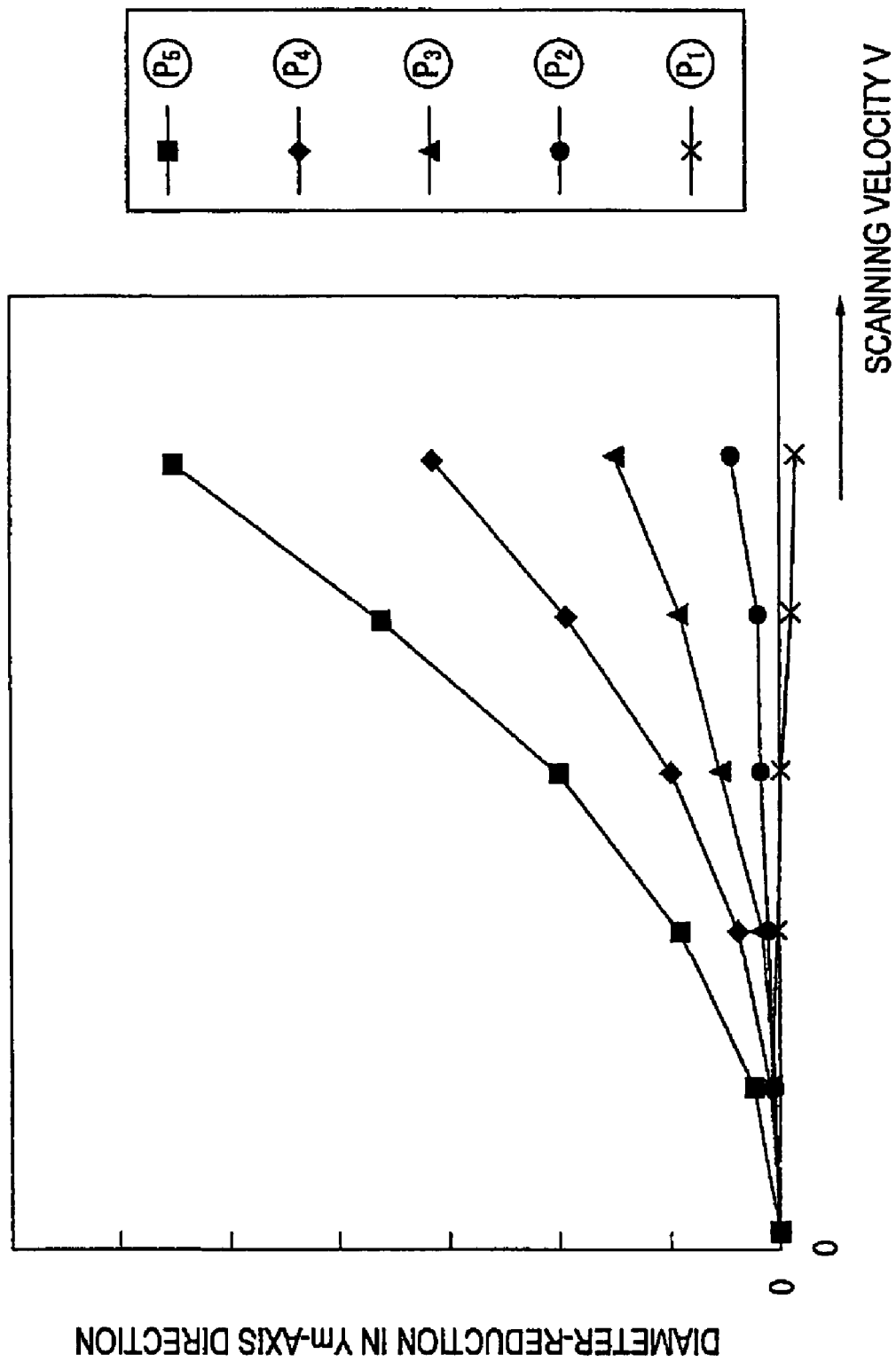
FIG. 8 is an illustration showing a relationship between a scanning velocity V and a radius decrease (radius error ΔR) when the circle is scan-measured at the respective points $P_1$ to $P_5$.

FIGS. 7 and 8 are illustrations showing a relationship between a scanning velocity V and a radius decrease (radius error $\Delta R$) when the circle is scan-measured at respective points $P_1$ to $P_5$.

Figure 22:
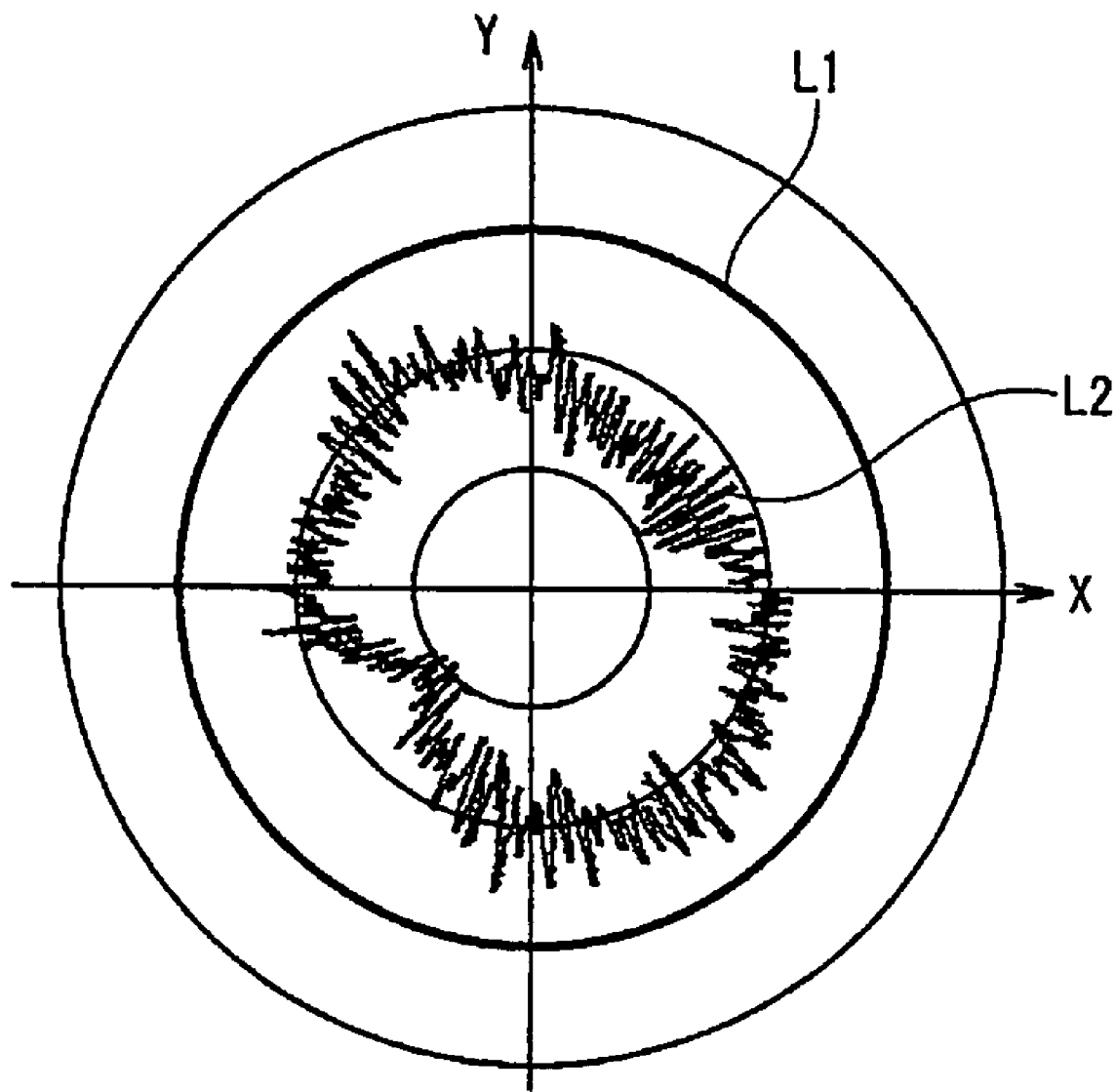
FIG. 22 is an illustration showing a result of radial deviation (measurement error).

Even when an approximately true circle is measured, the measurement results produce an ellipsoidal shape as shown in FIG. 22. This phenomenon occurs on account of difference between gain characteristics of X-axis and Y-axis, which will be referred to an ellipsoidal error hereinafter.

Accordingly, the vertical axis of FIG. 7 shows the maximum amount of the radius error $\Delta R$ in Xm-axis direction and the vertical axis of FIG. 8 shows the maximum amount of the radius error $\Delta R$ in Ym-axis direction.

Figure 9:
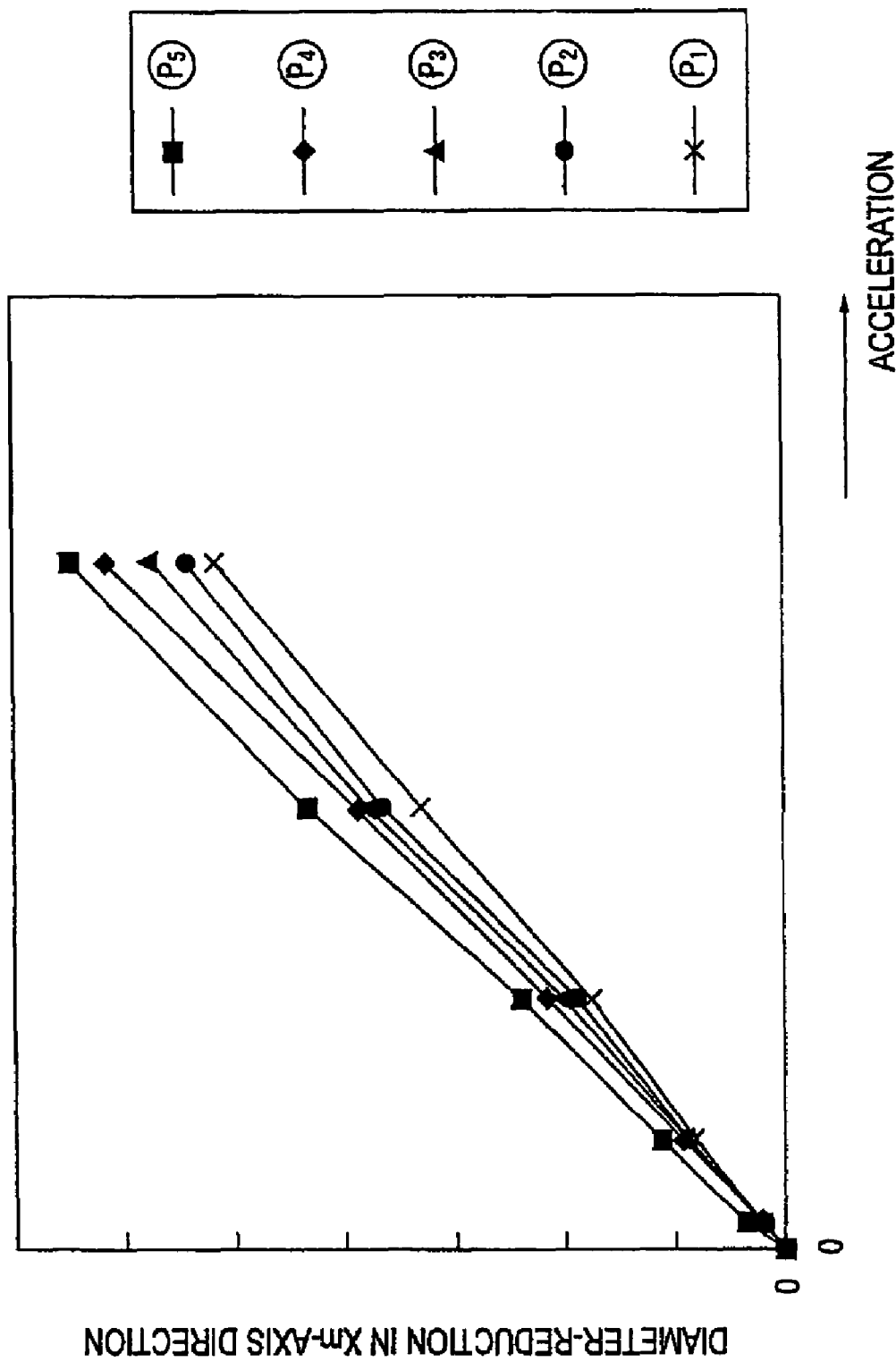
FIG. 9 is an illustration showing a relationship between the radius decrease and acceleration.
Figure 10:
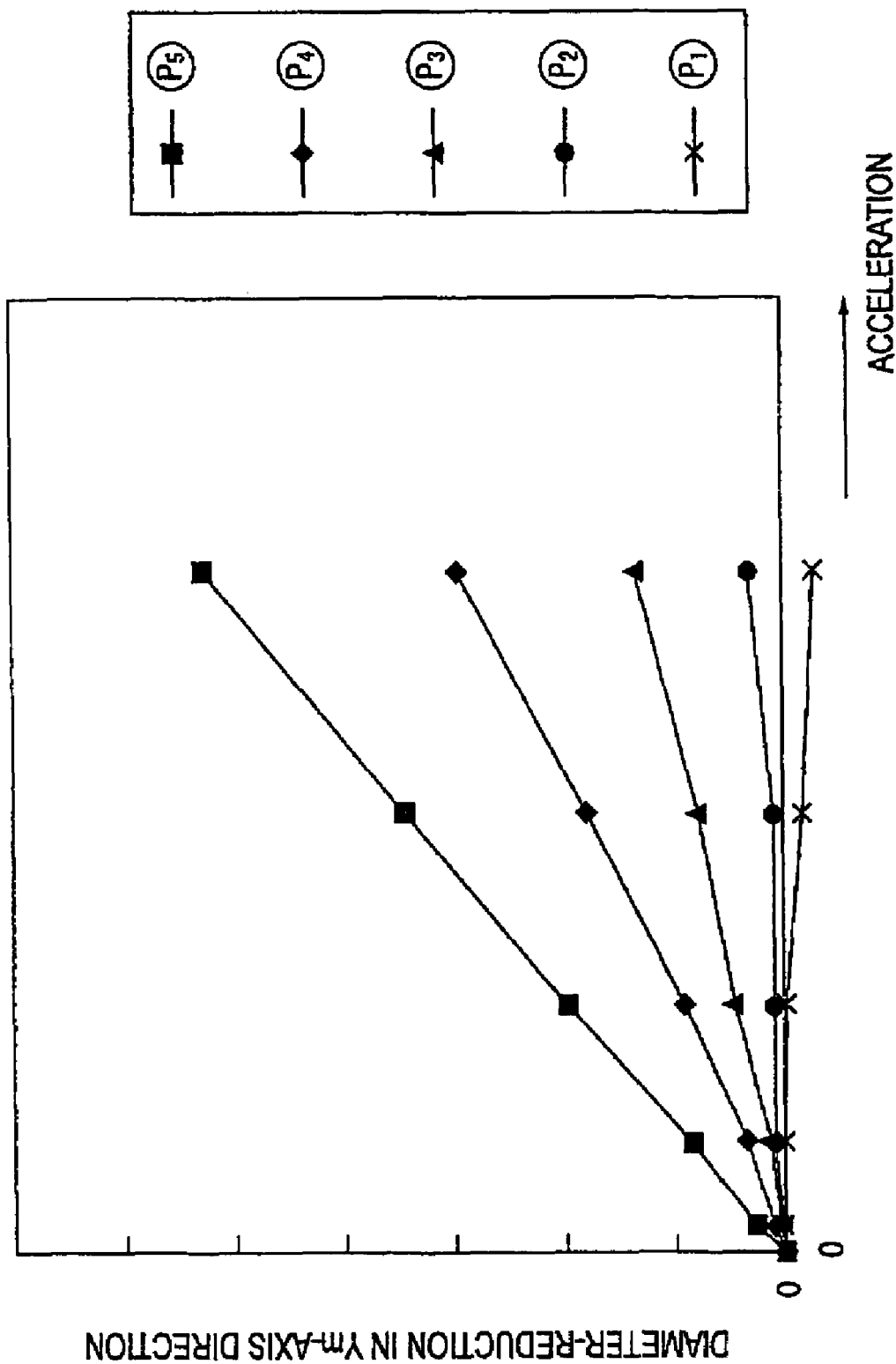
FIG. 10 is an illustration showing a relationship between the radius decrease and acceleration.

FIGS. 9 and 10 are graphs showing the relationship between the radius decrease (radius error $\Delta R$) and the acceleration by converting the scanning velocity of FIGS. 7 and 8 into acceleration.

The vertical axis of FIG. 9 shows the maximum amount of the radius error $\Delta R$ in Xm-axis direction as in FIG. 7. The vertical axis of FIG. 10 shows the maximum amount of the radius error $\Delta R$ in Ym-axis direction as in FIG. 8.

According to FIGS. 7 and 8, it can be seen that the measurement radius decrease (radius error $\Delta R$) interrelates to the power (e.g. square) of scanning velocity. However, FIGS. 9 and 10 show that the measurement radius decrease (radius error $\Delta R$) is proportional to the acceleration, where the above equation ($D = k \cdot A$) can be applied.

Figure 11:
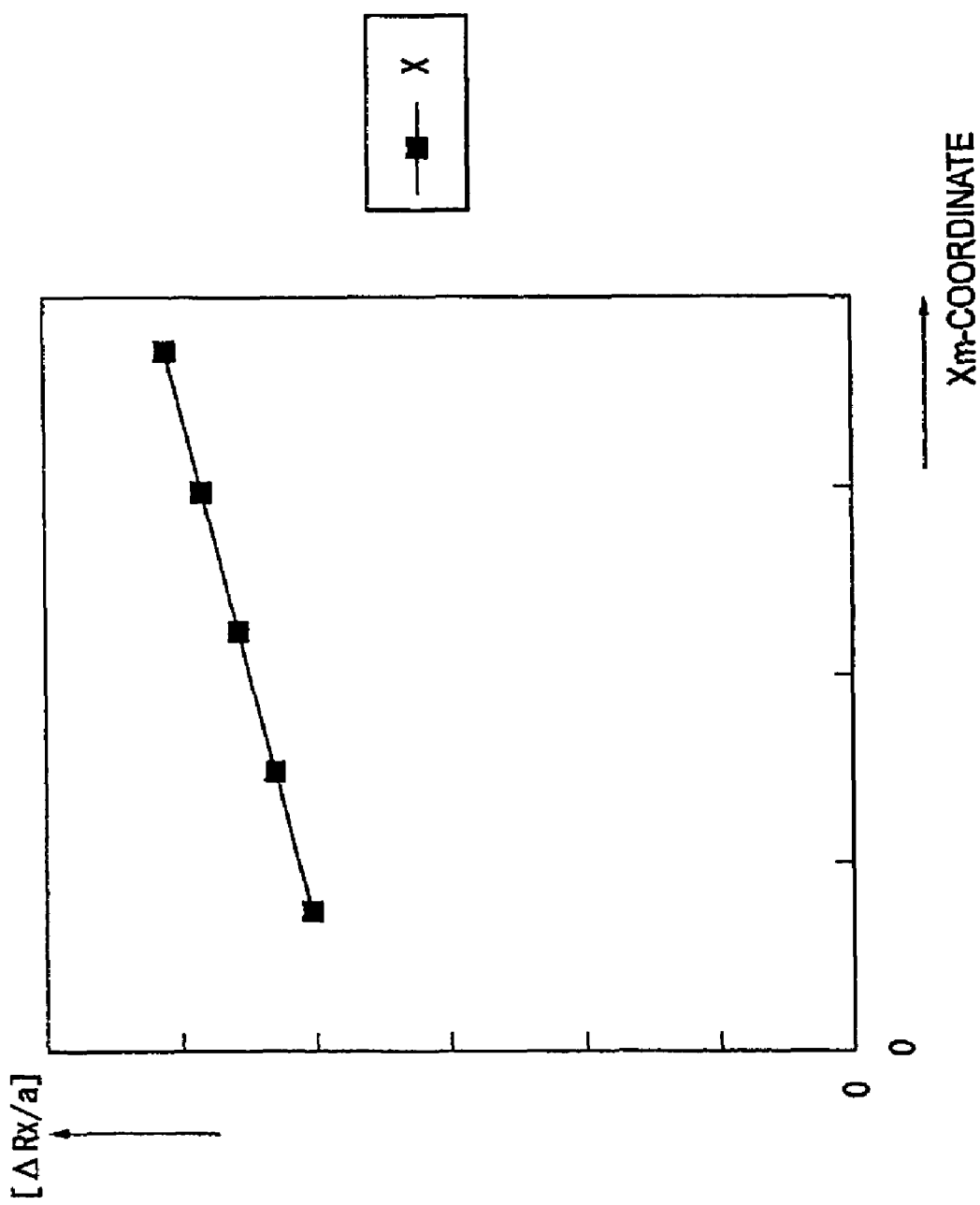
FIG. 11 is an illustration showing a relationship between a measured position and decrease in measurement radius.
Figure 12:
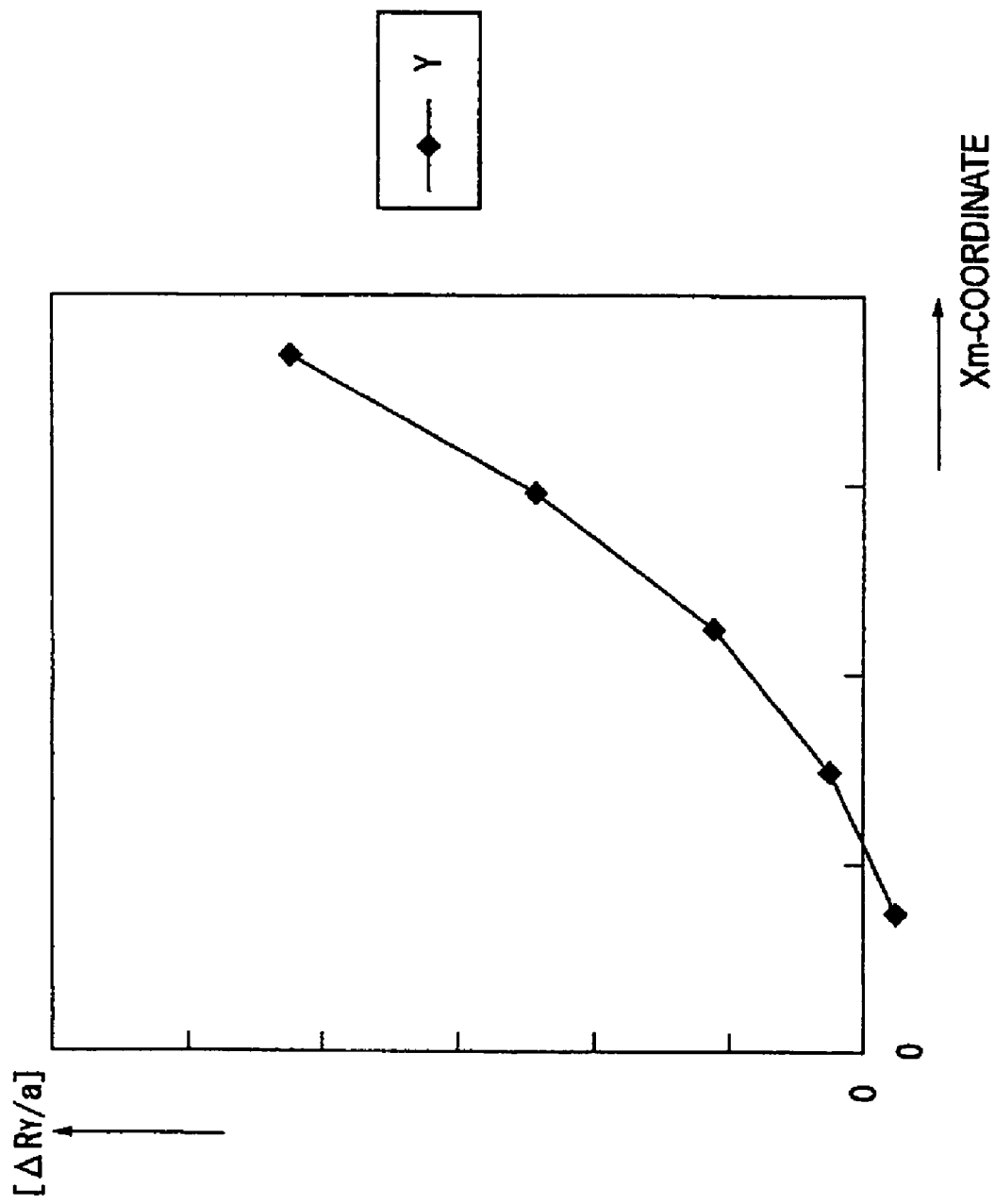
FIG. 12 is an illustration showing a relationship between a measured position and decrease in measurement radius.

FIGS. 11 and 12 are illustrations showing a relationship between a measured position and measurement radius decrease (radius error $\Delta R$).

In FIGS. 11 and 12, the vertical axis represents a normalized value ($\Delta R/a$) obtained by dividing measurement radius decrease (radius error $\Delta R$) by acceleration.

The vertical axis of FIG. 11 is a value ($\Delta Rx/a$) dividing the maximum amount ($\Delta Rx$) of the radius error $\Delta R$ in Xm-axis direction by acceleration. The vertical axis of FIG. 12 is a value ($\Delta Ry/a$) dividing the maximum amount ($\Delta Ry$) of the radius error $\Delta R$ in Ym-axis direction by acceleration.

From FIG. 11, it can be seen that the measurement radius decrease ($\Delta Rx$) linearly interrelates to Xm coordinate of the measured position in Xm-axis direction Further, it can be seen in FIG. 12 that measurement diameter decrease ($\Delta Ry$) in Ym-axis direction is influenced by the difference of the measured position in Xm-axis direction and is quadratically interrelated to the Xm coordinate.

After collecting the experimental data, the error ($d_x$, $d_y$, $d_z$) when the standard gauge is measured at different scanning velocities (or acceleration) at positions with different Xm, Ym and Zm coordinates is assigned to equation.

Then, the equation is solved to obtain the gain-correction parameters.

The obtained gain-correction parameters are stored in the correction-parameter storage 710.

Next, how to set the correction parameters for calculating the phase-difference-correction amount $\Phi$ will be described below.

According to difference in the frequency transfer characteristics and the drive gains for each drive-axis direction, phase difference in command transfer is generated for each axis during the circular movement.

The phase difference is set as the phase-difference correction-amount $\Phi$ and is acquired as a function of the rotation frequency f of the circular movement.

In order to simplify the description, a circular movement on XY plane is taken as an example.

The phase-difference correction-amount $\Phi$ is a function of the rotation frequency f, which is represented as polynomial equation of the rotation frequency f.

The act example is shown below.

Figure 13:
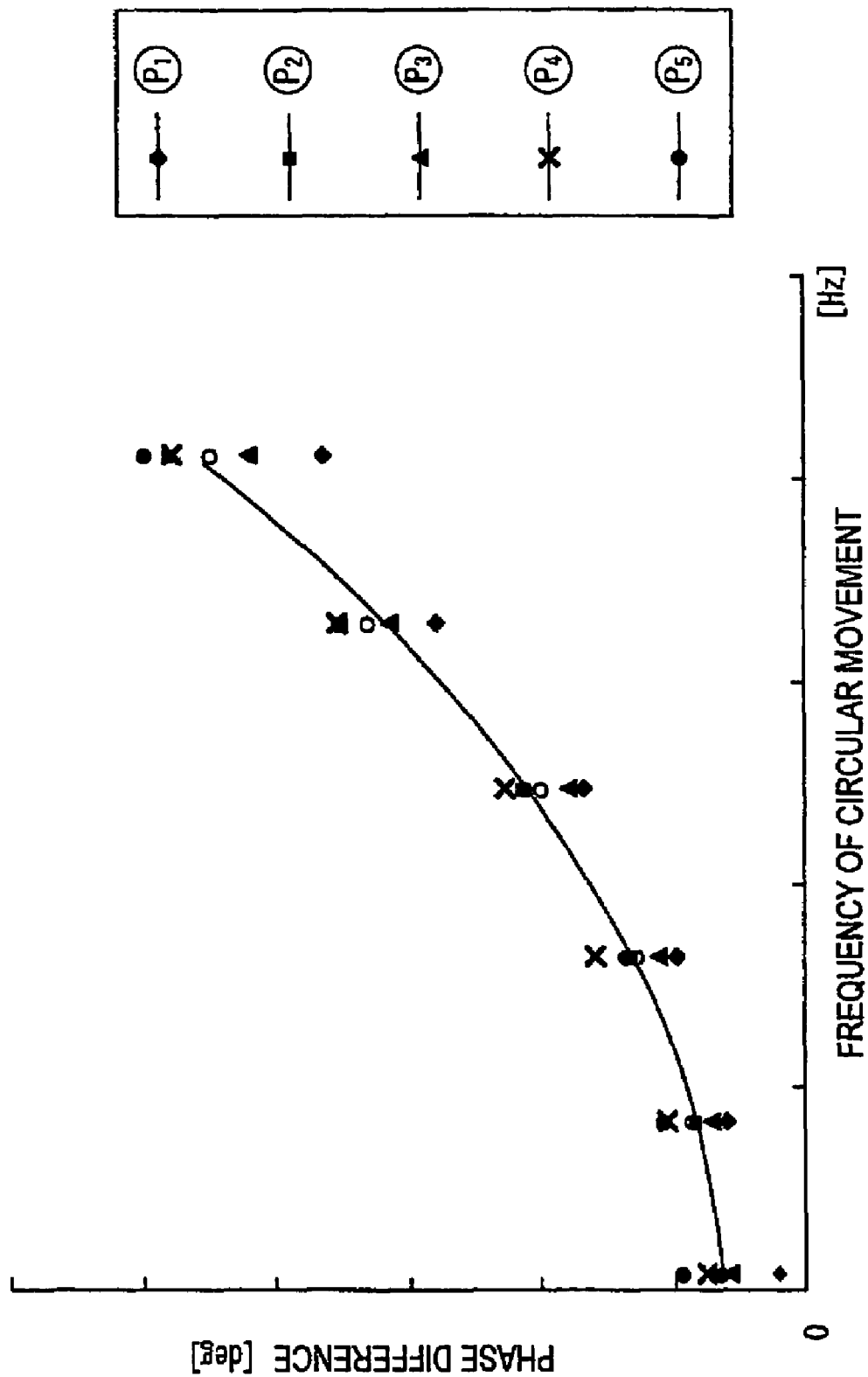
FIG. 13 is an illustration showing a relationship between a phase difference Φ generated between Ym-axis direction and Xm-axis direction and rotation frequency f of the circular movement.

FIG. 13 shows the result of scanning measurement of a circle at a plurality of locations $P_1$ to $P_5$ shown in FIG. 6.

In FIG. 13, the generated phase difference $\Phi$ is plotted in vertical axis and the rotation frequency f of the circular movement is plotted in horizontal axis.

As shown in FIG. 13, the phase difference $\Phi$ between Ym-axis direction and Xm-axis direction depends on rotation frequency f of the circular movement, and, though less influenced, also depends on measured position.

Accordingly, the phase difference $\Phi$ is represented as $\Phi = b_2 f^2 + b_1 f + \Phi_0$, where the coefficients $b_2$, $b_1$ and $\Phi_0$ is acquired based on the fitting curve.

Since the coefficients $b_2$, $b_1$ and $\Phi_0$ is influenced by the measured position, the phase difference $\Phi$ is represented as follows.

$$\phi = b_2 f^2 + b_1 f + \phi_0$$

$$\begin{pmatrix} b_2 \\ b_1 \\ \phi_0 \end{pmatrix} = \begin{pmatrix} \sigma_1 & \sigma_2 & \sigma_3 \\ \sigma_4 & \sigma_5 & \sigma_6 \\ \sigma_7 & \sigma_8 & \sigma_9 \end{pmatrix} \begin{pmatrix} x^2 \\ x \\ 1 \end{pmatrix}$$

$$\begin{pmatrix} \sigma_1 \\ \sigma_2 \\ \vdots \\ \sigma_9 \end{pmatrix} = \begin{pmatrix} \zeta_1 & \zeta_2 & \zeta_3 \\ \zeta_4 & \zeta_5 & \zeta_6 \\ \vdots & \vdots & \vdots \\ \zeta_{25} & \zeta_{26} & \zeta_{27} \end{pmatrix} \begin{pmatrix} y^2 \\ y \\ 1 \end{pmatrix}$$

$$\begin{pmatrix} \zeta_1 \\ \zeta_2 \\ \zeta_3 \\ \vdots \\ \zeta_{27} \end{pmatrix} = \begin{pmatrix} \tau_1 & \tau_2 & \tau_3 \\ \tau_4 & \tau_5 & \tau_6 \\ \tau_7 & \tau_8 & \tau_9 \\ \vdots & \vdots & \vdots \\ \tau_{79} & \tau_{80} & \tau_{81} \end{pmatrix} \begin{pmatrix} z^2 \\ z \\ 1 \end{pmatrix}$$

The correction parameters thus obtained is used to calculate the gain correction-amount and the phase-difference correction amount $\Phi$ as described in the first embodiment.

The measurement data can be corrected using the gain correction-amount and the phasedifference correction amount as discussed in the first embodiment.

Second Modification

Next a second modification of the present invention will be described below.

The second modification is substantially the same as the above-described first modification, which is characterized by calculation of the correction parameters for setting the correction parameters.

Specifically, in contrast to the first modification where an equation defining the deformation amount supposing that the deformation of the spindle 124 interrelates to the acceleration, the second modification uses an equation supposing that the deformation of the spindle 124 interrelates to the rotation frequency f.

The correction amount includes gain correction-amount and phase-difference correction amount. However, when the correction parameters for calculating the phase-difference correction amount are set, the same process as the first modification can be employed and the detailed explanation thereof will not be mentioned below.

Initially, how to set the correction parameters for calculating the gain correction-amount will be described below.

In the second modification, supposing that the gain correction-amount interrelates to the rotation frequency f, the relationship between the gain $|G_1|$ of the frequency transfer characteristics $G_1$ and the frequency f of the circular movement is represented by the following equation.

$$|G_1|=1-k(2\pi \cdot f)^2$$

In order to derive the equation, following equation transformation is taken as an example.

When deformation D is generated when a circular movement of radius Rs is commanded, the gain of the frequency transfer characteristics $G_1$ is represented by the following formula $$|G_1| = \frac{(Rs-D)}{Rs}$$
$$= 1 - \frac{D}{Rs}$$

Since the deformation D is proportional to the acceleration A (D=k·A), the equation can be further transformed as follows.

$$|G_1| = 1 - \frac{k \cdot A}{Rs}$$

The acceleration A is represented by the following equation using the rotation frequency f based on the relationship between the radius Rs of the circular movement and the angular velocity ω.

$$A = Rs \cdot \omega^2$$
$$= Rs \cdot (2\pi \cdot f)^2$$

Accordingly, the gain $|G_1|$ of the rotary frequency characteristics can be represented as follows.

$$|G_1| = 1 - \frac{k \cdot Rs \cdot (2\pi \cdot f)^2}{Rs}$$
$$= 1 - k(2\pi \cdot f)^2$$

The correction parameters k defining the relationship between the gain and the rotation frequency f are obtained by a designed value or an empirical value based on the above relational expressions.

The gain $|G_1|$ is calculated respectively in Xm-axis direction and Ym-axis direction.

Specifically, the Xm-axis gain is calculated as $|G_{1x}|$ and Ym-axis gain is calculated as $|G_{1y}|$.

When $|G_{1x}|$ and $|G_{1y}|$ are actually calculated, the scanning measurement of a circle is conducted at different positions with different rotation frequencies f as in the first modification and $|G_{1x}|$ and $|G_{1y}|$ are represented as a function of the position $(x_m, y_m)$ and the rotation frequency f based on the result thereof.

Further, the measurement value considering the thus-obtained gain correction amount ($|G_{1x}|, |G_{1y}|$) and the phase-difference correction amount Φ is corrected as follows.

Specifically, supposing that the detection value by the drive sensor 140 is $(x_m, y_m)$; the central coordinate of the circular movement is set as $(x0, y_0)$; and the radius of the circle is represented as Rs, the detection value of the drive sensor 140 is represented as follows using a predetermined phase θ.

$$x_m=x_0+R\cos\theta$$

$$y_m=y_0+R\sin\theta$$

Then, the detection value after applying the calculated gain correction amount ($|G_{1x}|, |G_{1y}|$) and the phase-difference Φ is represented as follows, where $x_m'$, $y_m'$ represents the corrected detection value of the drive sensor.

$$x_m'=x_0+R \cdot g_{1x} \cdot \cos\theta$$

$$y_m'=y_0+R \cdot g_{1y} \cdot \sin(\theta+\phi)$$

where $$g_{1x} = \frac{1}{|G_{1X}|}, g_{1y} = \frac{1}{|G_{1Y}|}$$

The surface position of the workpiece is determined at the position of the contact portion 132 acquired by synthesizing the corrected detection value $(x_m', y_m')$ of the drive sensor 140 and the detection value of the probe sensor 134 after reflecting the predetermined reference pressing amount Δr.

As discussed above, the correction parameters for calculating the gain correction-amount can be obtained by the process shown in the second modification.

Further, the measurement data can be corrected using the gain correction-amount and the phase-difference compensation amount.

Third Modification

Next, a third modification of the present invention will be described below.

The third modification is substantially the same as the above-described second modification, which is characterized by calculation of the correction parameters in setting the correction parameters.

Specifically, the correction equation is established on the basis that the deformation is expressed by a theoretical equation that interrelates to the rotation frequency f. However, in the third modification, the correction equation is established supposing that the deformation is expressed by a polynomial equation using the rotation frequency f.

Specifically, it is supposed that the gain correction-amount $|G1_x|$ in Xm-axis direction and the gain correction-amount $|G1_y|$ in Ym-axis direction is expressed as a polynomial equation related to rotation frequency f of the circular movement during scanning measurement of a circle.

An example of actual experiment will be shown below.

In acquiring the calibration data, standard gauges are placed at a plurality of different positions and a circle is scan-measured at a plurality of scanning velocity.

Figure 14:
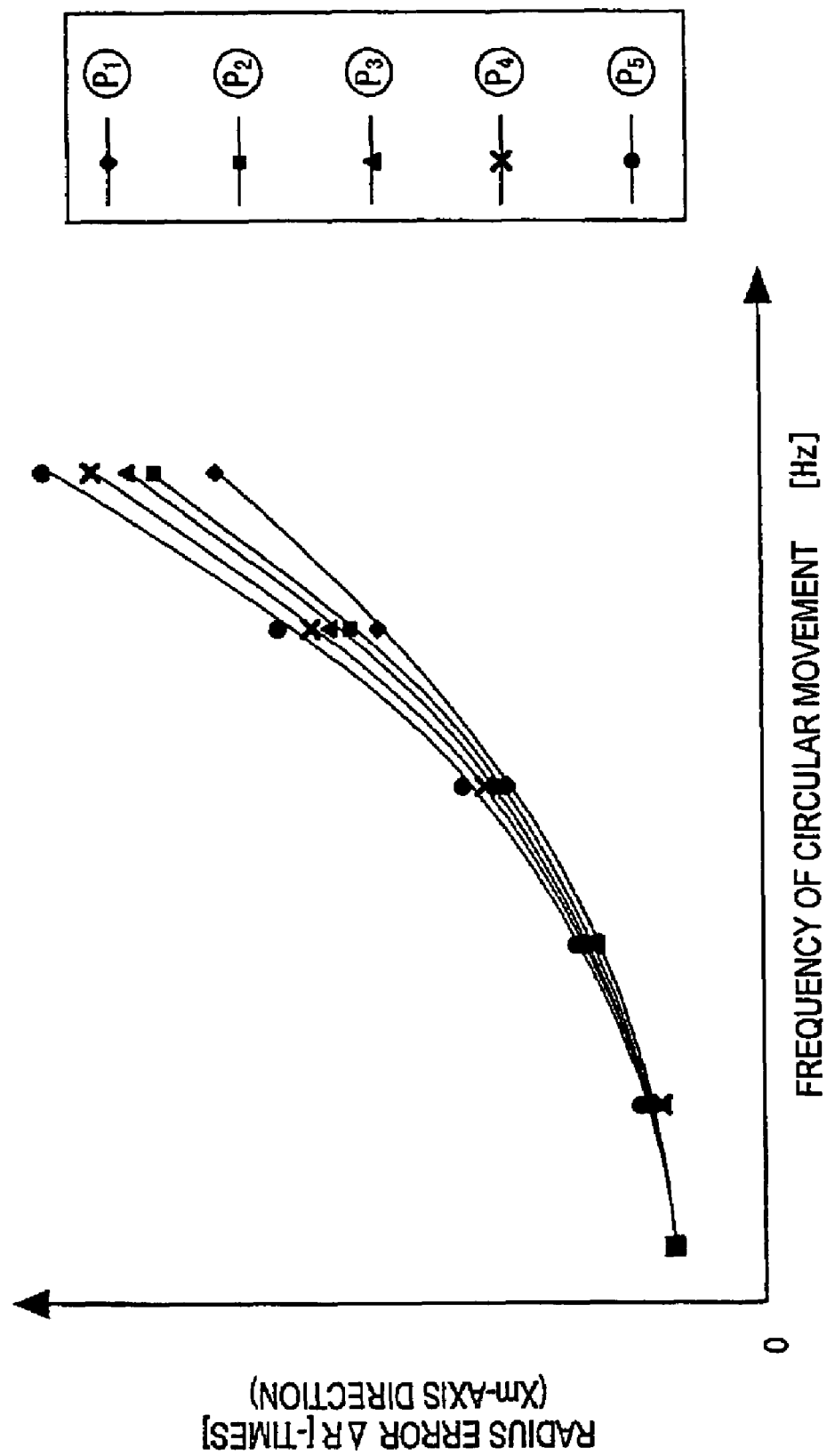
FIG. 14 is an illustration showing a relationship between a rotation frequency of scanning measurement and a radius error ΔR.

FIG. 14 is a graph in which rotation frequency during the scan-measurement is plotted in horizontal axis and maximum amount of radius error ΔR in Xm-axis direction is plotted in vertical direction.

Figure 15:
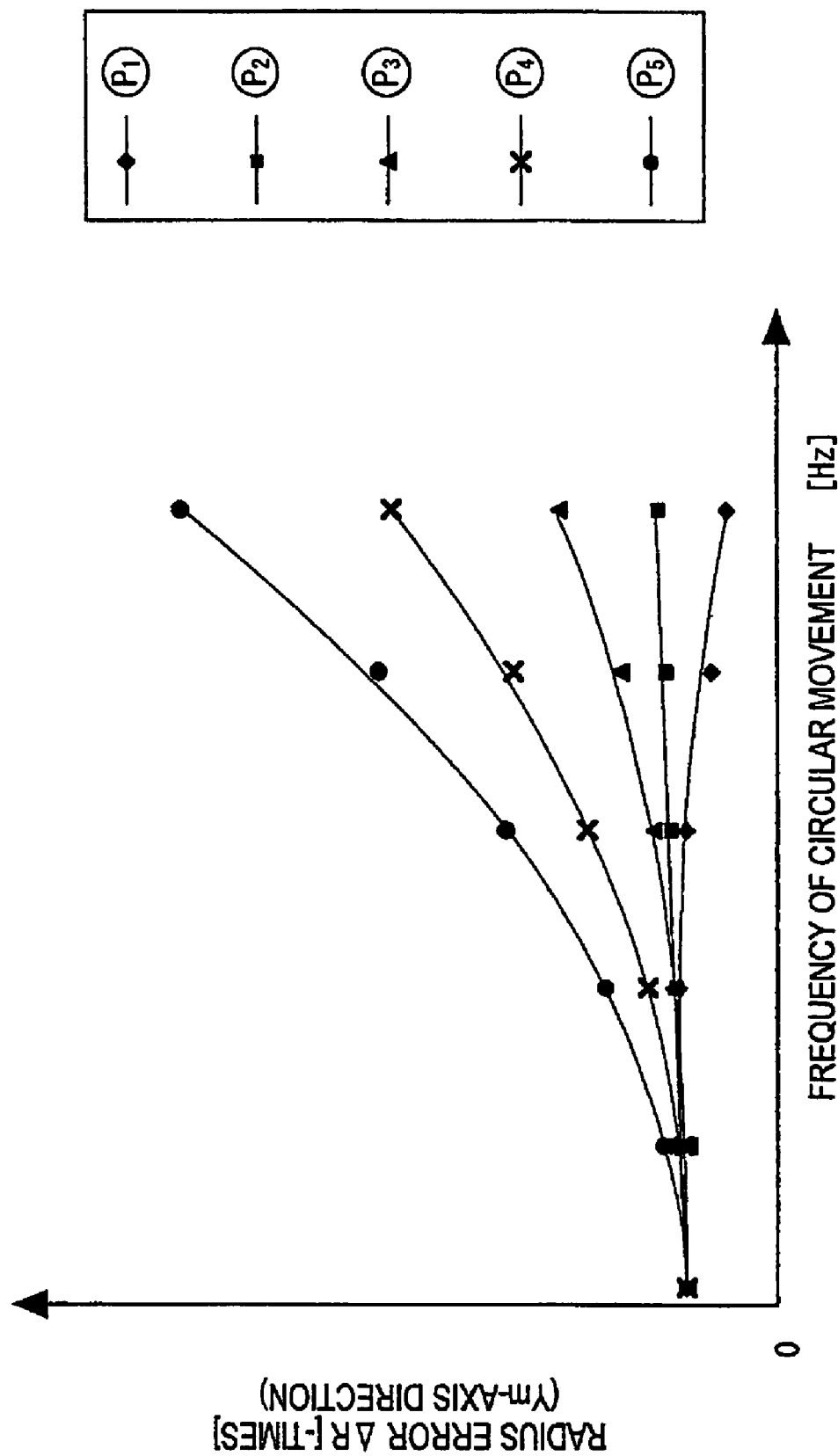
FIG. 15 is an illustration showing a relationship between a rotation frequency of scanning measurement and a radius error ΔR.

FIG. 15 is a graph in which rotation frequency during the scan-measurement is plotted in horizontal axis and maximum amount of radius error ΔR in Ym-axis direction is plotted in vertical direction.

The measured position is the same as the first modification, which is the result of scanning measurement of a circle at a plurality of locations $P_1$ to $P_5$ shown in FIG. 6.

In both of Xm-axis direction in FIG. 14 and Ym-axis direction in FIG. 15, the relationship between the rotation frequency of the scanning measurement and the measurement error (radius error ΔR) can be fitted by a second-order polynomial equation of the rotation frequency f. The gain error $|G_{1x}|$ in Xm-axis direction (Xm-direction of radius error ΔR) and the gain error $|G_{1y}|$ in Ym-axis direction (Ym-direction of radius error ΔR) can be represented using a predetermined coefficient as follows.

$$|G_{1X}|=\phi_2 f^2+\phi_1 f+1$$

$$|G_{1Y}|=\eta_2 f^2+\eta_1 f+1$$

The deformation changes in accordance with the measured position and therefore is a function of the measured position.

Figure 16:
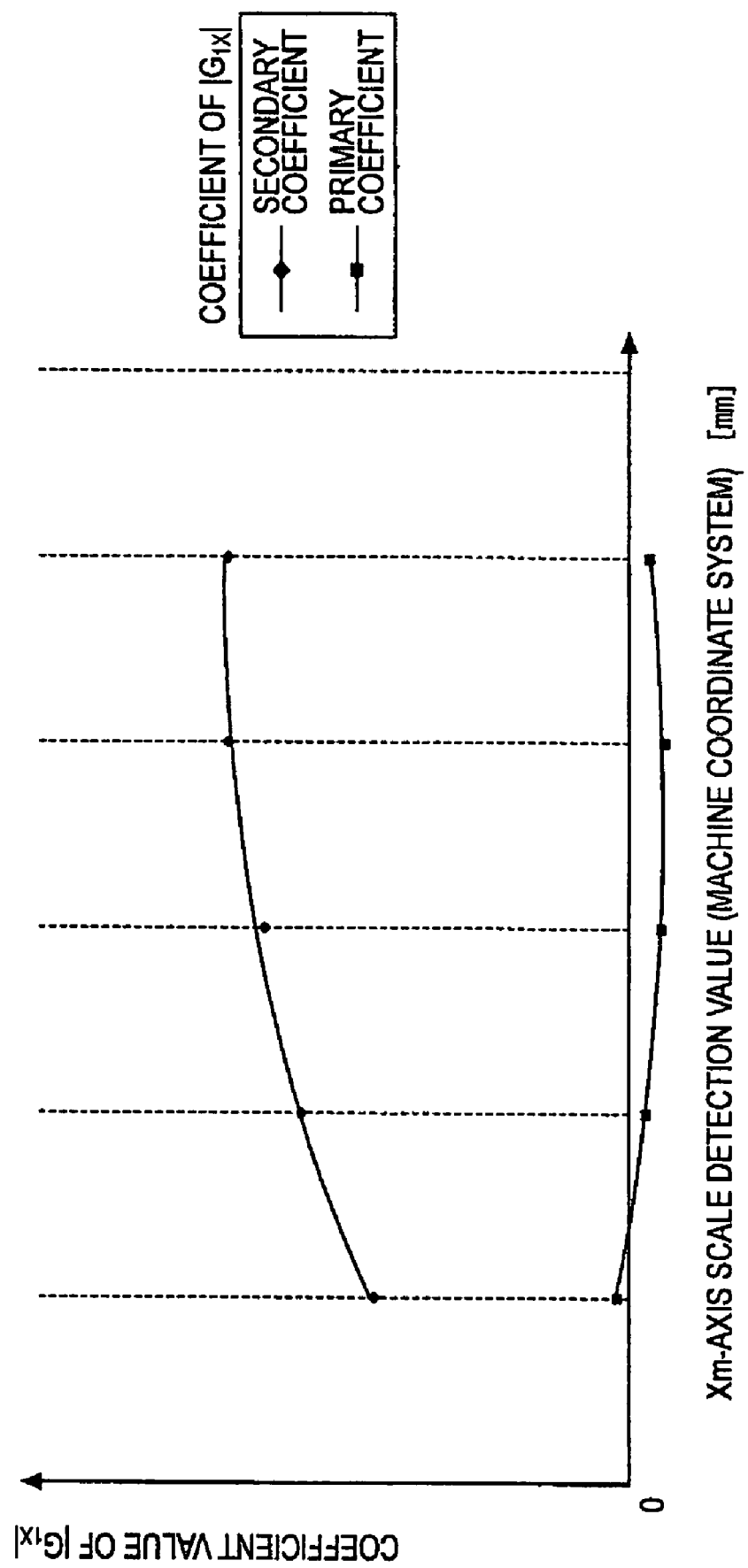
FIG. 16 is an illustration showing a relationship between a coefficient and coordinates of gain error.

FIG. 16 is a graph showing the relationship between the coefficient of the gain error $|G_{1x}|$ in Xm-axis direction and the Xm coordinate.

Figure 17:
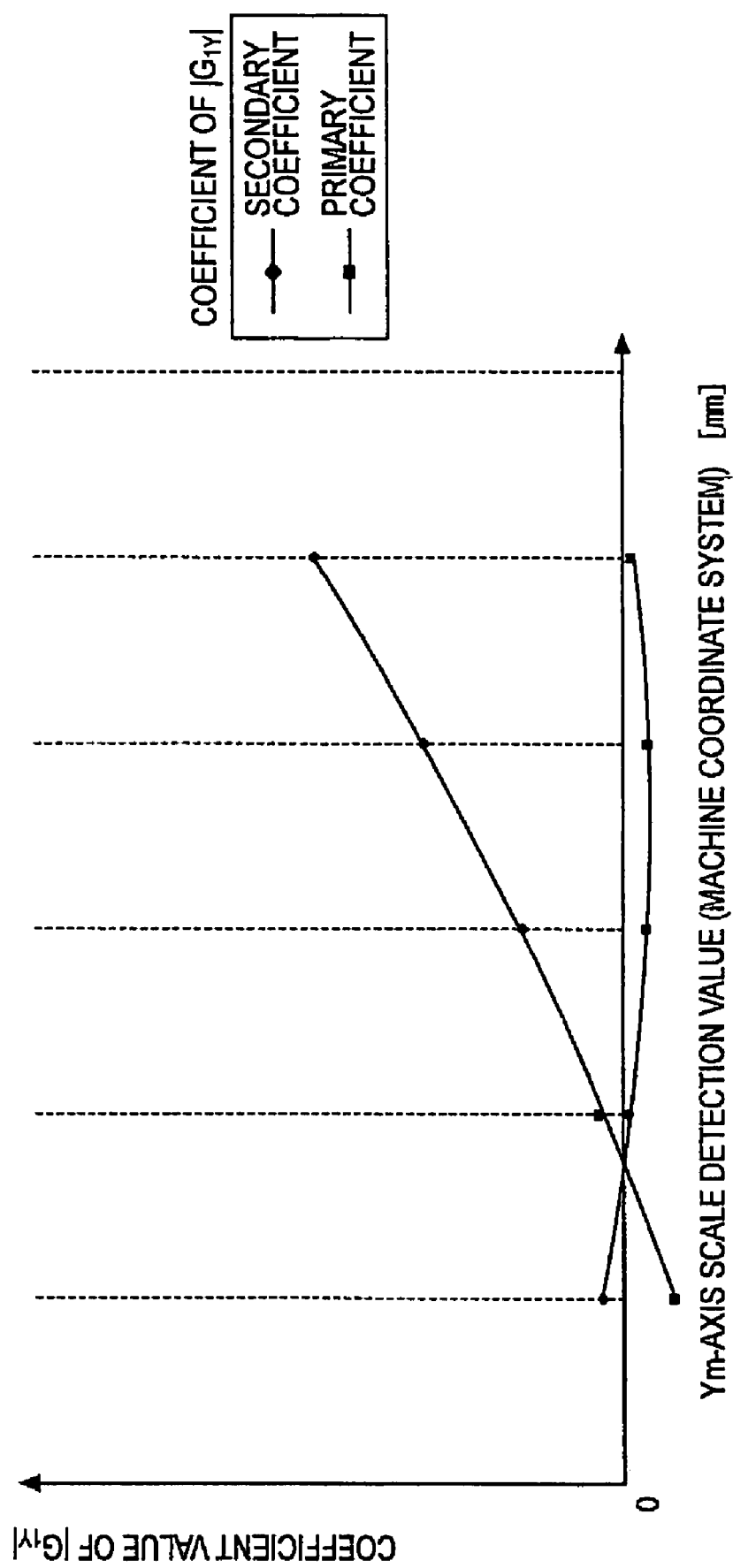
FIG. 17 is an illustration showing a relationship between a coefficient of gain error and coordinates.

FIG. 17 is a graph showing the relationship between the coefficient of the gain error $|G_{1y}|$ in Ym-axis direction and the Ym coordinate.

Specifically, the coefficients $\phi_2$, $\phi_1$, $\eta_2$, $\eta_1$ are functions of measured position, which can be represented as follows.

The coefficients used in an equation for obtaining the Xm-axis direction gain $\phi_2$, $\phi_1$ can be respectively represented as a function of x coordinate as follows.

$$\phi_2=u_{22}x^2+u_{21}x+u_{20}$$

$$\phi_1=u_{12}x^2+u_{11}x+u_{10}$$

The coefficients used in an equation for obtaining the Ym-axis direction gain $\eta_2$, $\eta_1$ can be respectively represented by a function of y coordinate as follows.

$$\eta_2=v_{22}y^2+v_{21}y+v_{20}$$

$$\eta_1=v_{12}y^2+v_{11}y+v_{10}$$

Correction parameters $\gamma_1$, $\gamma_2$, $\eta_2$, $\eta_1$ indicating the relationship between the gain and the rotation frequency are determined based on the above relational equations.

The obtained gain-correction parameters are stored in the correction-parameter storage 710.

In correcting the measured value during the actual measurement, the following equation is used for correction calculation based on the gain correction amount ($|G_{1x}|$, $|G_{1y}|$) and the phase difference Φ.

$$x_m'=x_0+R \cdot g_{1x} \cdot \cos\theta$$

$$y_m'=y_0+R \cdot g_{1y} \cdot \sin(\theta+\phi)$$

ただし、

$$g_{1x}=\frac{1}{|G_{1X}|}, \; g_{1y}=\frac{1}{|G_{1Y}|}$$

The correction parameters for calculating the gain correction-amount can be calculated by the above third modification.

Further, the measurement data can be corrected using the gain correction-amount and the phase-difference correction-amount.

Second Embodiment

Next, a second embodiment of the present invention will be described below.

The basic arrangement of the second embodiment is substantially the same as the above-described first embodiment. What is specific about the second embodiment is the provision of an estimation-judging unit 800 that judges the accuracy of the acceleration estimation by comparing an estimated acceleration value calculated by the movement-estimating unit 600 with actual acceleration.

Figure 18:
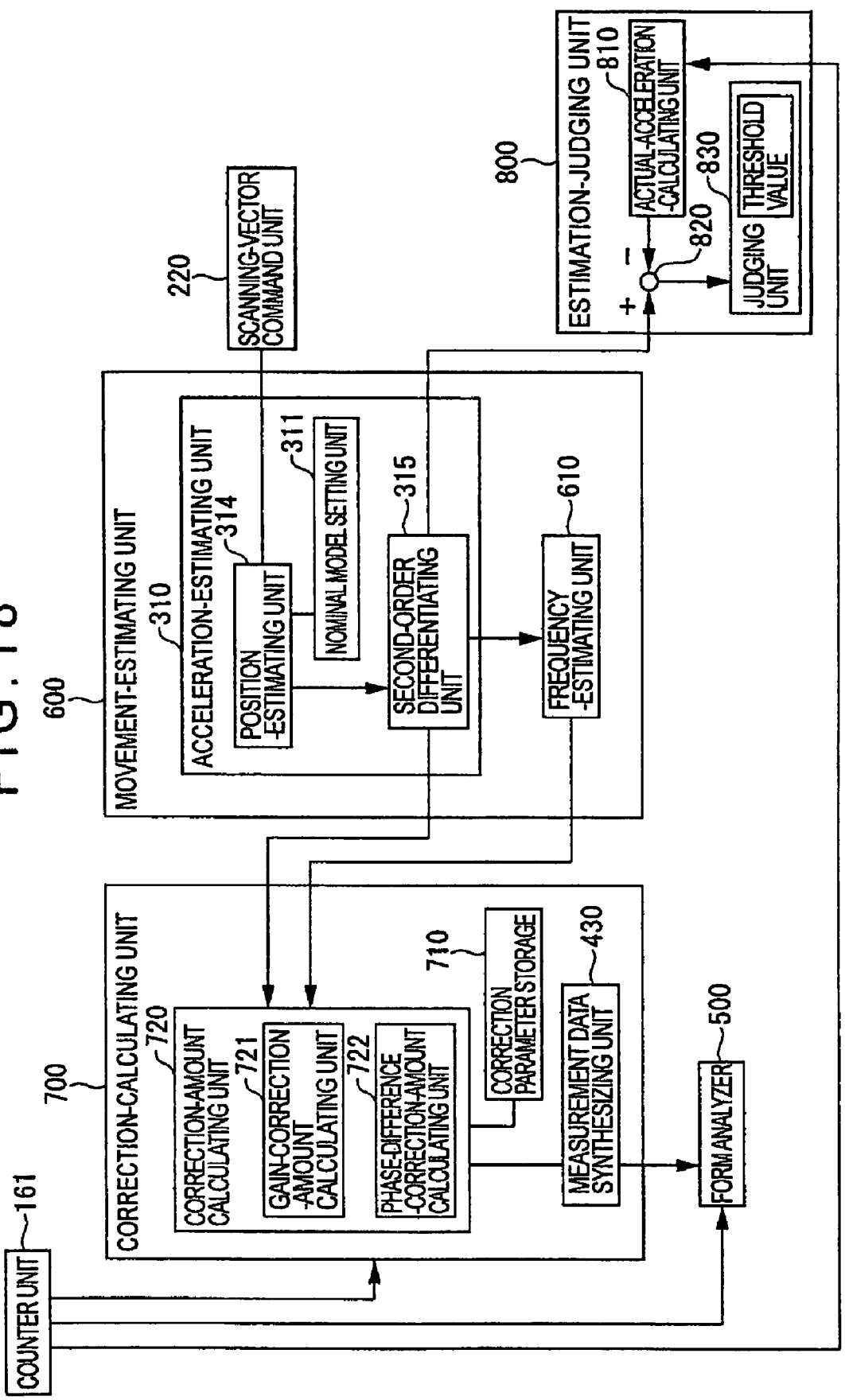
FIG. 18 is an illustration showing an arrangement of a movement-estimating unit, correction-calculating unit and an estimation-judging unit of a second embodiment of the present invention.

FIG. 18 is an illustration showing an arrangement of a movement-estimating unit, correction-calculating unit and an estimation-judging unit of the second embodiment.

The estimation-judging unit 800 includes: an actual acceleration calculating unit 810 for calculating an actual acceleration based on the measured value of the coordinates detected by the counter unit 161; a difference-calculating unit 820 that compares an estimated acceleration value calculated by the movement-estimating unit 600 to the actual acceleration calculated by the actual acceleration calculating-unit 810; and a judging unit 830 that compares a difference value calculated by the difference-calculating unit 820 with a predetermined threshold value to judge the accuracy of the estimated acceleration value.

The counter value from the drive counter 171 is input into the actual acceleration calculating unit 810. The actual acceleration calculating unit 810 conducts second-order differential on the counter value from the drive counter 171 to calculate the actual acceleration.

The calculated actual acceleration is outputted to the difference-calculating unit 820.

The estimated acceleration value from the second-order differentiating unit 315 and the actual acceleration from the actual acceleration calculating unit 810 are input to the difference-calculating unit 820.

The difference-calculating unit 820 calculates difference value $\delta_a$ by subtracting the actual acceleration $a_R$ from the estimated acceleration a.

The calculated difference value $\delta_a$ is outputted to the judging unit 830.

A threshold value is set in advance in the determining unit 830.

The threshold value is a value for judging whether the difference value $\delta_a$ between the estimated acceleration a and the actual acceleration $a_R$ is excessively large to hinder normal function of the acceleration estimation, thus making the correction based on estimated acceleration impossible.

The difference value $\delta_a$ calculated by the difference calculating unit 820 is input into the judging unit 830 and the judging unit 830 compares the difference value $\delta_a$ with the threshold value.

When the difference value $\delta_a$ is smaller than the threshold value $\delta_s$ ($|\delta_a|<\delta_s$), continuation of the measurement operation is commanded.

On the other hand, when the difference value $\delta_a$ is equal to or greater than the threshold value $\delta_s$ ($|\delta_a|\geqq\delta_s$) the result is indicated to a user through the output unit 62.

Alternatively, the correction calculation by the correction-amount calculating unit 700 is stopped.

According to thus-arranged second embodiment, since the estimation-judging unit 800 is provided, the accuracy of the acceleration estimation by the movement estimating unit 600 can be judged.

Since the correction calculation is continued or stopped in accordance with the judging result, output of erroneous measurement result on account of erroneous correction of the measurement data can be prevented.

Incidentally, the surface-profile measuring instrument of the present invention is not limited solely to the above embodiments and modifications, but includes various modifications as long as an object of the present invention can be achieved.

Though acceleration is taken as an example of the estimated movement state quantity, the scanning velocity may be used as the estimated movement state quantity instead of acceleration. In this case, the relationship between the scanning velocity and the correction amount may be calculated so that the correction calculation is possible based on the scanning velocity.

Though the position is estimated from the nominal model and acceleration is estimated by conducting second-order differential on the estimated position in the above embodiment, a nominal model for directly calculating acceleration from the positional command of the scanning vector may be set.

The estimation-judging unit 800 may include a low-pass filter therein and high-frequency noise may be cut from the actual acceleration obtained by the actual acceleration calculating unit 810. Accordingly, judgment error on account of the high-frequency noise can be prevented.

The priority application Numbers JP2006-243376 and JP2007-216380 upon which this patent application is based are hereby incorporated by reference.

What is claimed is:

1. A surface-profile measuring instrument, comprising:
    a scanning probe including a probe to be moved toward or contacted with a workpiece surface with an arc portion on at least a part thereof, the scanning probe scanning the workpiece surface while keeping the relative position between the probe and the workpiece surface at a predetermined reference position;
    a scanning vector commanding unit that commands a scanning vector command indicating a next movement position of the scanning probe along the workpiece surface;
    a drive mechanism having a drive shaft that holds and three-dimensionally moves the scanning probe in accordance with the scanning vector command;
    a drive sensor that detects a drive amount of the drive mechanism; and
    a correction calculating unit that calculates a detection value of the drive sensor in accordance with the scanning vector command commanded by the scanning vector commanding unit, wherein the correction calculating unit calculates a correction-amount for correcting a measurement error generated by a deformation of the drive mechanism in accordance with the movement thereof;
    wherein the correction calculating unit includes:
    a correction-parameter storage that stores a correction parameter representing a relationship between acceleration caused on the scanning probe and the deformation of the drive mechanism;
    a correction-amount calculating unit that calculates a correction amount for correcting the detection value of the drive sensor based on the acceleration caused on the scanning probe;
    a measurement data synthesizing unit that synthesizes the calculated correction-amount with the detection value of the drive sensor to acquire the position of the workpiece surface;
    wherein the correction-amount calculating unit includes a phase-difference correction-amount calculating unit,
    the correction parameter storage stores the correction parameter for correcting a phase difference, and
    the correction parameter ($b_2$, $b_1$) for correcting the phase difference is calculated based on: a relational equation $$\Phi = b_2 f^2 + b_1 f + \Phi_0$$

in which $\Phi$ represents a phase-difference correction amount, f represents a rotation frequency during a scanning measurement and $\Phi_0$ is an initial phase difference; and a result of scanning measurement of a circle gauge at different positions within a measurement area with different scanning velocities.

2. A surface-profile measuring instrument, comprising:
    a scanning probe including a probe to be moved toward or contacted with a workpiece surface with an arc portion on at least a part thereof, the scanning probe scanning the workpiece surface while keeping the relative position between the probe and the workpiece surface at a predetermined reference position;
    a scanning vector commanding unit that commands a scanning vector command indicating a next movement position of the scanning probe along the workpiece surface;
    a drive mechanism having a drive shaft that holds and three-dimensionally moves the scanning probe in accordance with the scanning vector command;
    a drive sensor that detects a drive amount of the drive mechanism; and
    a correction calculating unit that calculates a detection value of the drive sensor in accordance with the scanning vector command commanded by the scanning vector commanding unit, wherein the correction calculating unit calculates a correction-amount for correcting a measurement error generated by a deformation of the drive mechanism in accordance with the movement thereof;
    wherein the correction calculating unit includes:
    a correction-parameter storage that stores a correction parameter representing a relationship between acceleration caused on the scanning probe and the deformation of the drive mechanism;
    a correction-amount calculating unit that calculates a correction amount for correcting the detection value of the drive sensor based on the acceleration caused on the scanning probe;
    a measurement data synthesizing unit that synthesizes the calculated correction-amount with the detection value of the drive sensor to acquire the position of the workpiece surface;
    wherein the correction-amount calculating unit includes a gain correction-amount calculating unit, the correction parameter storage stores the correction parameter for correcting a gain, k, and the correction parameter for correcting the gain is calculated based on: a relational equation of D=k·A, in which a gain correction-amount is D and the acceleration of the movement of the scanning probe during the scanning measurement is A; and a result of the scanning measurement of the circle gauge at different positions within the measurement area with different scanning velocities.

3. A surface-profile measuring instrument, comprising:

a scanning probe including a probe to be moved toward or contacted with a workpiece surface with an arc portion on at least a part thereof, the scanning probe scanning the workpiece surface while keeping the relative position between the probe and the workpiece surface at a predetermined reference position;

a scanning vector commanding unit that commands a scanning vector command indicating a next movement position of the scanning probe along the workpiece surface;

a drive mechanism having a drive shaft that holds and three-dimensionally moves the scanning probe in accordance with the scanning vector command;

a drive sensor that detects a drive amount of the drive mechanism; and a correction calculating unit that calculates a detection value of the drive sensor in accordance with the scanning vector command commanded by the scanning vector commanding unit, wherein the correction calculating unit calculates a correction-amount for correcting a measurement error generated by a deformation of the drive mechanism in accordance with the movement thereof;

wherein the correction calculating unit includes:

a correction-parameter storage that stores a correction parameter representing a relationship between acceleration caused on the scanning probe and the deformation of the drive mechanism;

a correction-amount calculating unit that calculates a correction amount for correcting the detection value of the drive sensor based on the acceleration caused on the scanning probe;

a measurement data synthesizing unit that synthesizes the calculated correction-amount with the detection value of the drive sensor to acquire the position of the workpiece surface;

wherein the correction-amount calculating unit includes a gain correction-amount calculating unit, the correction parameter storage stores the correction parameter for correcting a gain, k, and the correction parameter for correcting the gain is calculated based on: a relational equation of $$|G_1| = 1 - k(2\pi \cdot f)^2,$$

in which $|G_1|$ represents a gain of a frequency transfer characteristics $G_1$ and f is a rotation frequency during the scanning measurement; and a result of the scanning measurement of the circle gauge at different positions within the measurement area with different scanning velocities.

4. A surface-profile measuring instrument, comprising:

a scanning probe including a probe to be moved toward or contacted with a workpiece surface with an arc portion on at least a part thereof, the scanning probe scanning the workpiece surface while keeping the relative position between the probe and the workpiece surface at a predetermined reference position;

a scanning vector commanding unit that commands a scanning vector command indicating a next movement position of the scanning probe along the workpiece surface;

a drive mechanism having a drive shaft that holds and three-dimensionally moves the scanning probe in accordance with the scanning vector command;

a drive sensor that detects a drive amount of the drive mechanism; and a correction calculating unit that calculates a detection value of the drive sensor in accordance with the scanning vector command commanded by the scanning vector commanding unit, wherein the correction calculating unit calculates a correction-amount for correcting a measurement error generated by a deformation of the drive mechanism in accordance with the movement thereof;

wherein the correction calculating unit includes:

a correction-parameter storage that stores a correction parameter representing a relationship between acceleration caused on the scanning probe and the deformation of the drive mechanism;

a correction-amount calculating unit that calculates a correction amount for correcting the detection value of the drive sensor based on the acceleration caused on the scanning probe;

a measurement data synthesizing unit that synthesizes the calculated correction-amount with the detection value of the drive sensor to acquire the position of the workpiece surface;

wherein the correction-amount calculating unit includes a gain correction-amount calculating unit, the correction parameter storage stores the correction parameter for correcting a gain, and the correction parameter for correcting the gain is a coefficient of a polynomial equation derived by a relationship between the rotation frequency and the gain derived by a result of the scanning measurement of the circle gauge at different positions within the measurement area with different scanning velocities.

* * * * *